US012699914B2

(12) United States Patent
Wang et al.

(10) Patent No.: US 12,699,914 B2
(45) Date of Patent: Aug. 4, 2026

(54) APPROXIMATE QUANTUM COMPILING WITH ERROR MITIGATION

(71) Applicant: International Business Machines Corporation, Armonk, NY (US)

(72) Inventors: Derek Wang, New York, NY (US); Yunseong Nam, Altadena, CA (US); Jonah Ezekiel, Stanford, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

(21) Appl. No.: 18/883,562

(22) Filed: Sep. 12, 2024

(65) Prior Publication Data

US 2026/0073271 A1     Mar. 12, 2026

(51) Int. Cl.
*G06N 10/70* (2022.01)

(52) U.S. Cl.
CPC .................................. *G06N 10/70* (2022.01)

(58) Field of Classification Search
CPC ...................................................... G06N 10/70
See application file for complete search history.

(56) References Cited

U.S. PATENT DOCUMENTS

| | | | |
|---|---|---|---|
| 10,247,693 | B2 | 4/2019 | Che et al. |
| 10,664,761 | B2 | 5/2020 | Haener et al. |
| 10,726,352 | B2 | 7/2020 | Bishop |
| 10,755,193 | B2 | 8/2020 | Kandala et al. |
| 10,915,831 | B2 | 2/2021 | Bishop et al. |
| 10,997,337 | B2 | 5/2021 | Low et al. |
| 11,010,517 | B2 | 5/2021 | Nam et al. |
| 11,113,084 | B2 | 9/2021 | Kliuchnikov et al. |
| 11,558,069 | B1 | 1/2023 | Sparrow |
| 11,568,297 | B2 | 1/2023 | Maslov et al. |
| 11,657,315 | B2 | 5/2023 | Niu et al. |
| 11,715,026 | B2 | 8/2023 | Oliver et al. |
| 11,720,430 | B2 | 8/2023 | Rhee et al. |
| 11,829,842 | B2 | 11/2023 | Javadiabhari et al. |
| 11,894,107 | B2 | 2/2024 | Setia et al. |
| 11,928,004 | B2 | 3/2024 | Earnest-Noble |

(Continued)

OTHER PUBLICATIONS

Noether, Emmy "Invariante Variationsprobleme" Math-phys. Klasse, S. 235-257, (1918) (translation by M.A. Tavel included).

(Continued)

*Primary Examiner* — Thien Nguyen

(74) *Attorney, Agent, or Firm* — Amin, Turocy & Watson, LLP

(57) ABSTRACT

A system comprises a memory that stores computer executable components, and a processor that executes the computer executable components stored in the memory, wherein the computer executable components comprise an approximating component that generates an approximating unitary from an original unitary, the approximating unitary based on a symmetry of the original unitary and omitting a selected operator of an exponentiated sum of operators comprised by the original unitary, and a checking component that directs operation of a check quantum circuit at a quantum computer, the check quantum circuit based on a quantum circuit output of an operation of the approximating unitary at the quantum computer, resulting in a determination of a violation of the symmetry.

17 Claims, 11 Drawing Sheets

(56) References Cited

U.S. PATENT DOCUMENTS

| | | | |
|---|---|---|---|
| 11,941,490 B2 | 3/2024 | Egger | |
| 11,954,563 B2 | 4/2024 | Sawaya et al. | |
| 11,960,971 B2 | 4/2024 | Bravyi et al. | |
| 11,966,813 B2 | 4/2024 | Barkoutsos et al. | |
| 12,001,268 B2 | 6/2024 | Palmer Da Silva | |
| 12,020,117 B2 | 6/2024 | Javadiabhari | |
| 12,020,121 B2 | 6/2024 | Debnath et al. | |
| 12,020,122 B1 | 6/2024 | Jurcevic et al. | |
| 2019/0042392 A1* | 2/2019 | Matsuura | G06N 10/70 |
| 2021/0192113 A1 | 6/2021 | Nam et al. | |
| 2021/0263753 A1 | 8/2021 | Gunlycke | |
| 2021/0264309 A1 | 8/2021 | Wang et al. | |
| 2021/0294680 A1 | 9/2021 | Palmer Da Silva | |
| 2022/0019928 A1 | 1/2022 | Jiang et al. | |
| 2022/0092460 A1 | 3/2022 | Piveteau et al. | |
| 2022/0108201 A1 | 4/2022 | Javadiabhari et al. | |
| 2022/0114047 A1 | 4/2022 | Rhee et al. | |
| 2022/0138607 A1 | 5/2022 | Camps et al. | |
| 2022/0188182 A1 | 6/2022 | Capelluto et al. | |
| 2022/0300849 A1 | 9/2022 | Tannu et al. | |
| 2023/0016817 A1 | 1/2023 | Premaratne et al. | |
| 2023/0020166 A1 | 1/2023 | Elfving et al. | |
| 2023/0042892 A1 | 2/2023 | Wang et al. | |
| 2023/0072535 A1 | 3/2023 | Upadhyay | |
| 2023/0112724 A1 | 4/2023 | Low | |
| 2023/0169381 A1 | 6/2023 | Wang et al. | |
| 2023/0196174 A1 | 6/2023 | Cai et al. | |
| 2023/0274172 A1 | 8/2023 | Niu et al. | |
| 2023/0306295 A1 | 9/2023 | Puchala et al. | |
| 2024/0062090 A1 | 2/2024 | Suchowski et al. | |
| 2024/0119112 A1 | 4/2024 | Haah et al. | |
| 2024/0127102 A1 | 4/2024 | Maksymov et al. | |
| 2024/0152794 A1 | 5/2024 | Chiaro et al. | |
| 2024/0169237 A1 | 5/2024 | Prati et al. | |
| 2024/0176694 A1 | 5/2024 | Niroula et al. | |
| 2024/0220836 A1 | 7/2024 | Debroy et al. | |
| 2025/0013715 A1* | 1/2025 | Izmaylov | G06F 17/16 |
| 2025/0307676 A1* | 10/2025 | Nishi | G06F 7/38 |

OTHER PUBLICATIONS

Nam, et al. "Ground-state energy estimation of the water molecule on a trapped-ion quantum computer" npj Quantum Information, (20200 6:33, 6 pages.

Nam, et al. "Automated optimization of large quantum circuits with continuous parameters" npj Quantum Information vol. 4, Article No. 23 (2018).

Wang, et al. "Resource-Optimized Fermionic Local-Hamiltonian Simulation on a Quantum Computer for Quantum Chemistry" arXiv:2004.04151v3 [quant-ph] Jul. 21, 2021, 36 pages.

Wang, et al. "Ever more optimized simulations of fermionic systems on a quantum computer" arXiv:2303.03460v1 [quant-ph] Mar. 6, 2023, 7 pages.

Draper, Thomas G. "Addition on a Quantum Computer" arXiv:quant-ph/0008033, Aug. 7, 2000, 8 pages.

Karp, Richard M. "Reducibility Among Combinatorial Problems" Complexity of Computer Computations, 1972, 19 pages.

Unknown "Cycle (graph theory)" Wikipedia, https://en.wikipedia.org/wiki/Cycle_(graph_theory), Last Accessed Sep. 11, 2024, 5 pages.

Unknown "NP-completeness" Wikipedia, https://en.wikipedia.org/wiki/NP-completeness, Last Accessed Sep. 11, 2024, 10 pages.

Unknown "Graph (discrete mathematics)" Wikipedia, https://en.wikipedia.org/wiki/Graph_(discrete_mathematics), Last Accessed Sep. 11, 2024, 10 pages.

Unknown "Karp's 21 NP-complete problems" Wikipedia, https://en.wikipedia.org/wiki/Karp%27s_21_NP-complete_problems, Last Accessed Sep. 11, 2024, 2 pages.

Unknown "Directed graph" Wikipedia, https://en.wikipedia.org/wiki/Directed_graph, Last Accessed Sep. 11, 2024, 6 pages.

Unknown "Feedback vertex set" Wikipedia, https://en.wikipedia.org/wikiFeedback_vertex_set#CITEREFKarp1972, Last Accessed Sep. 11, 2024, 5 pages.

Unknown "Combinatorial optimization" Wikipedia, https://en.wikipedia.org/wiki/Combinatorial_optimization, Last Accessed Sep. 11, 2024, 6 pages.

Unknown "Travelling salesman problem" Wikipedia, https://en.wikipedia.org/wiki/Travelling_salesman_problem, Last Accessed Sep. 11, 2024, 21 pages.

Akibue, et al. "Quadratic improvement on accuracy of approximating pure quantum states and unitary gates by probabilistic implementation" Cornell University Library, arXiv:2111.05531v4, pp. 1-16, Feb. 3, 2022.

Faist, et al. "Continuous symmetries and approximate quantum error correction" Physical Review X 10, 041018 (2020), 31 pages.

Tran, et al. "Faster Digital Quantum Simulation by Symmetry Protection" arXiv:2006.16248v2 [quant-ph] Feb. 14, 2021, 27 pages.

Shaydulin, et al. "Error Mitigation for Deep Quantum Optimization Circuits by Leveraging Problem Symmetries" arXiv:2106.04410v2 [quant-ph] Jun. 9, 2021, 10 pages.

Van Den Berg, et al. "Single-shot error mitigation by coherent Pauli checks" arXiv:2212.03937v1 [quant-ph] Dec. 7, 2022, 30 pages.

Peruzzo, et al. "A variational eigenvalue solver on a photonic quantum processor" communications, 5(1):4213, 2014, 10 pages.

Trotter, Hale F. "On the product of semi-groups of operators" Proceedings of the American Mathematical Society, 10(4):545-551, 1959.

Bartlett, et al., "Alternative coupled-cluster ansatze ii. the unitary coupled-cluster method" Chemical physics letters, 155(1), Feb. 17, 1989, 08 pages.

* cited by examiner

FIG. 4

TABLE 400: EXAMPLE APPROXIMATE FERMIONIC EXCITATIONS

| | | List of combinations | Errors introduced |
|---|---|---|---|
| Two strings | | +XYYY, +YXYY | 0000,0001,0010 |
| | | −YXXX, −XYXX | 0000,0001,0010 |
| | | −YYXY, +XXXY | 0000,0001,0010 |
| | | +XXYX, −YYYX | 0000,0001,0010 |
| | | +XXXY, +XXYX | 0000,0100,1000 |
| | | −YYYX, −YYXY | 0000,0100,1000 |
| | | −XYXX, +XYYY | 0000,0100,1000 |
| | | +YXYY, −YXXX | 0000,0100,1000 |
| Four strings | | +XYYY, +YXYY, −YXXX, −XYXX | 0000 |
| | | +XXXY, +XXYX, −YYYX, −YYXY | 0000 |
| | | +XYYY, +YXYY, +XXYX, −YYYX | 0001 |
| | | −YXXX, −XYXX, −YYXY, +XXXY | 0001 |
| | | +XYYY, +YXYY, +YYXY, −XXXY | 0010 |
| | | −YXXX, −XYXX, +XXYX, −YYYX | 0010 |
| | | +XXXY, +XXYX, +XYYY, −YXYY | 0100 |
| | | −YYYX, −YYXY, −YXXX, +XYXX | 0100 |
| | | −YYYX, −YYXY, +XYYY, −YXXX | 1000 |
| | | +XXXY, +XXYX, +YXYY, −XYXX | 1000 |
| | | −YYYX, −YYXY, −XYYY, +XYXX | |

CHECKING PROCESSES 600

GENERATE QUANTUM CIRCUIT OUTPUTS (320)

GENERATE CHECK QUANTUM CIRCUITS (602)

DIRECT EXECUTION OF CHECK QCS (604)

ALL CHECK QCS OPERATED? (606)

NO

YES

PERFORM CONSERVATION CHECK 607/ SYMMETRY CHECK 611 (608)

DETERMINE VIOLATION OF CONSERVATION/ VIOLATION OF SYMMETRY (610)

DISCARD VIOLATING SHOT (612)

DETERMINE RESPONSE TO BASELINE INQUIRY (614)

700

TABLE 700: EXAMPLE NUMBER OF CNOT GATES AND ANCILLAE SUFFICIENT TO ACHIEVE CHEMICAL ACCURACY FOR VARIOUS APPROXIMATIONS AND MITIGATION SETTINGS

| min(W) | Which conservation | Number of digits | CNOT counts | Ancillae counts | Δε |
|---|---|---|---|---|---|
| 0 | None | N/A | 62-7 | 0 | 1.6 |
| | Overall | 1 | 62+12 | 1 | 1.6 |
| | | 2 | 62+34 | 2 | 1.5 |
| | | 3 | 62+52 | 3 | 1.3 |
| | | 4 | 62+62 | 4 | 1.3 |
| | Each Spin | 1 | 62+12 | 2 | 1.6 |
| | | 2 | 62+32 | 4 | 1.3 |
| | | 3 | 62+44 | 6 | 1.3 |
| 1 | None | N/A | 72-5 | 0 | 1.5 |
| | Overall | 1 | 72+12 | 1 | 1.5 |
| | | 2 | 72+34 | 2 | 1.4 |
| | | 3 | 72+52 | 3 | 1.3 |
| | | 4 | 72+62 | 4 | 1.3 |
| | Each Spin | 1 | 72+12 | 2 | 1.5 |
| | | 2 | 72+32 | 4 | 1.9 |
| | | 3 | 72+44 | 6 | 1.3 |
| 2 | None | N/A | 88-5 | 0 | 1.3 |
| | Overall | 1 | 88+12 | 1 | 1.3 |
| | | 2 | 88+34 | 2 | 1.3 |
| | | 3 | 88+52 | 3 | 1.3 |
| | | 4 | 88+62 | 4 | 1.3 |
| | Each Spin | 1 | 88+12 | 2 | 1.3 |
| | | 2 | 88+32 | 4 | 1.3 |
| | | 3 | 88+44 | 6 | 1.3 |
| N/A | None | N/A | 111-5 | 0 | 1.6 |

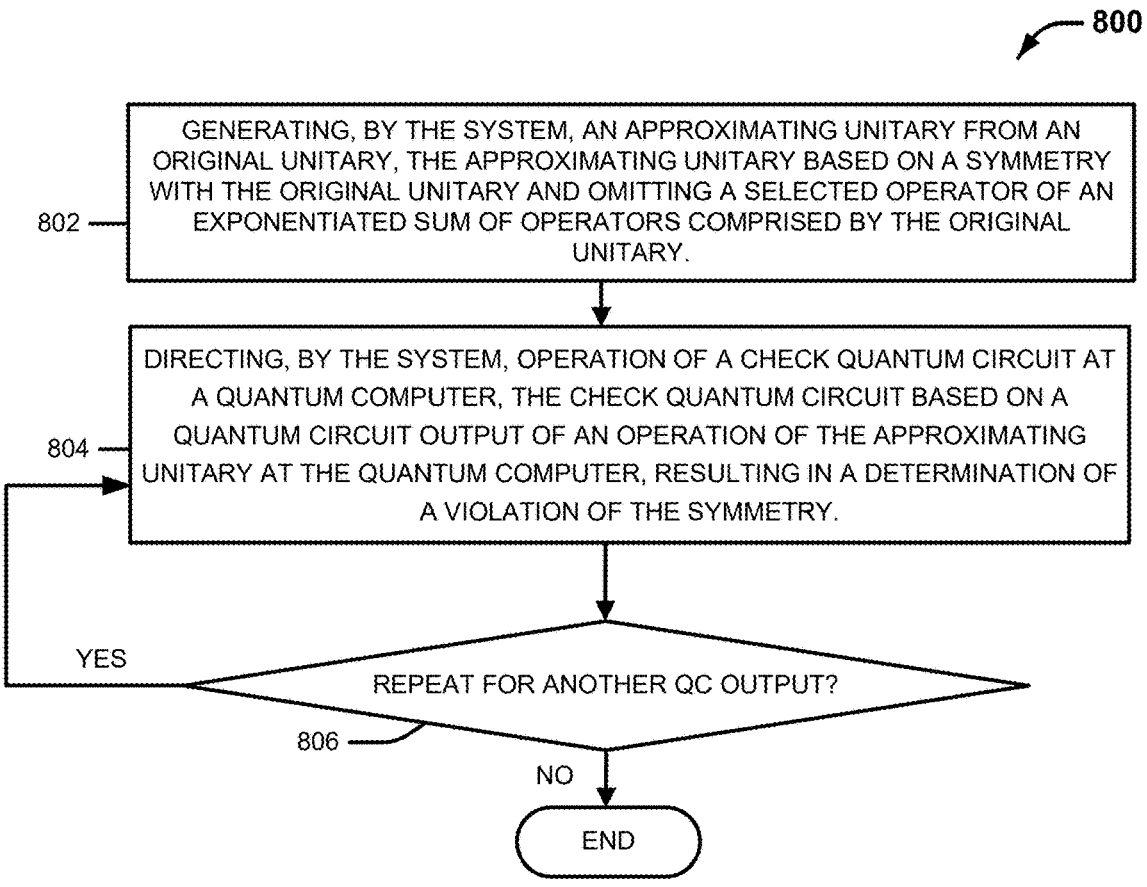

802 — GENERATING, BY THE SYSTEM, AN APPROXIMATING UNITARY FROM AN ORIGINAL UNITARY, THE APPROXIMATING UNITARY BASED ON A SYMMETRY WITH THE ORIGINAL UNITARY AND OMITTING A SELECTED OPERATOR OF AN EXPONENTIATED SUM OF OPERATORS COMPRISED BY THE ORIGINAL UNITARY.

804 — DIRECTING, BY THE SYSTEM, OPERATION OF A CHECK QUANTUM CIRCUIT AT A QUANTUM COMPUTER, THE CHECK QUANTUM CIRCUIT BASED ON A QUANTUM CIRCUIT OUTPUT OF AN OPERATION OF THE APPROXIMATING UNITARY AT THE QUANTUM COMPUTER, RESULTING IN A DETERMINATION OF A VIOLATION OF THE SYMMETRY.

YES

806 — REPEAT FOR ANOTHER QC OUTPUT?

NO

END

FIG. 8

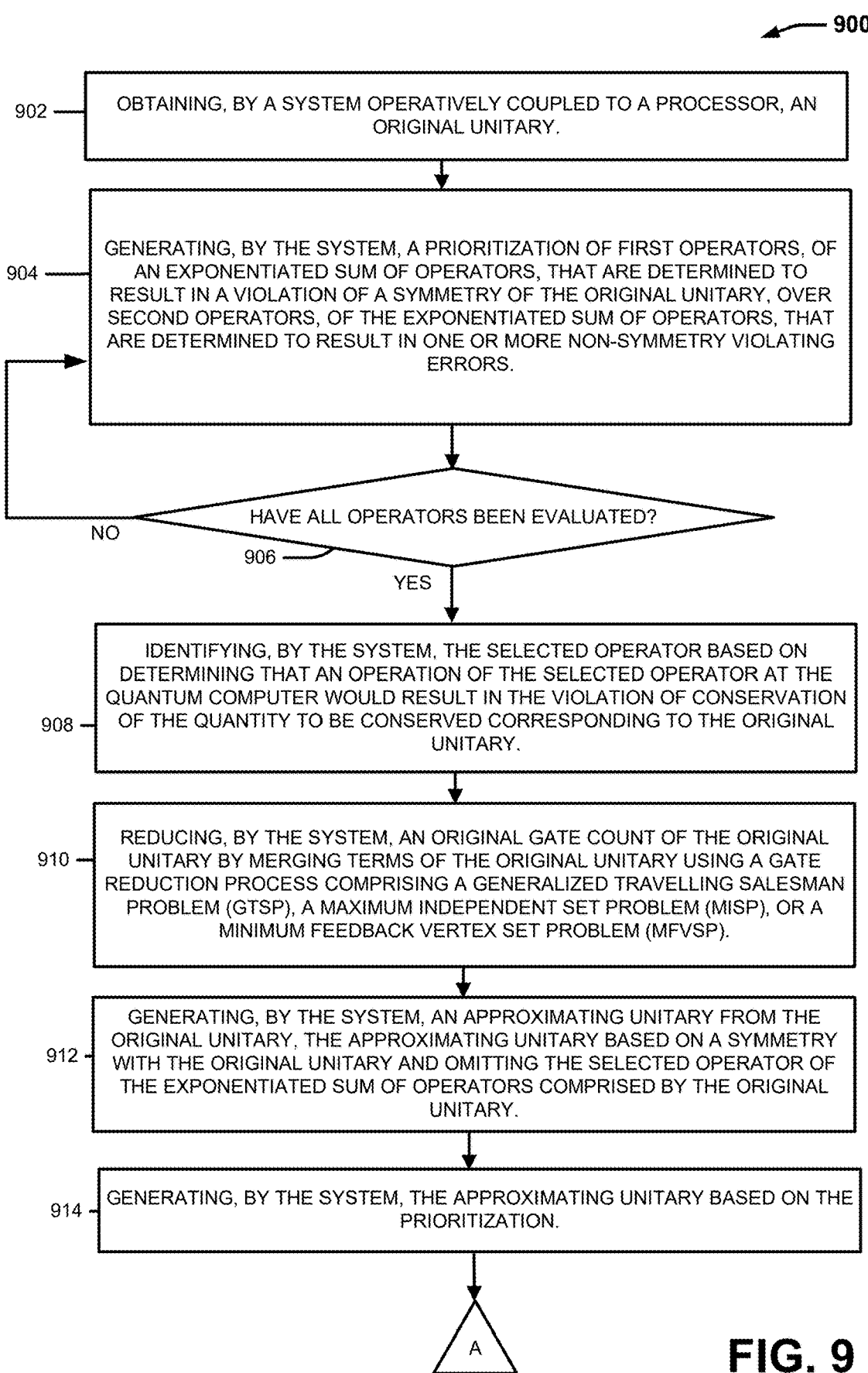

900

902 — OBTAINING, BY A SYSTEM OPERATIVELY COUPLED TO A PROCESSOR, AN ORIGINAL UNITARY.

904 — GENERATING, BY THE SYSTEM, A PRIORITIZATION OF FIRST OPERATORS, OF AN EXPONENTIATED SUM OF OPERATORS, THAT ARE DETERMINED TO RESULT IN A VIOLATION OF A SYMMETRY OF THE ORIGINAL UNITARY, OVER SECOND OPERATORS, OF THE EXPONENTIATED SUM OF OPERATORS, THAT ARE DETERMINED TO RESULT IN ONE OR MORE NON-SYMMETRY VIOLATING ERRORS.

906 — HAVE ALL OPERATORS BEEN EVALUATED?

NO

YES

908 — IDENTIFYING, BY THE SYSTEM, THE SELECTED OPERATOR BASED ON DETERMINING THAT AN OPERATION OF THE SELECTED OPERATOR AT THE QUANTUM COMPUTER WOULD RESULT IN THE VIOLATION OF CONSERVATION OF THE QUANTITY TO BE CONSERVED CORRESPONDING TO THE ORIGINAL UNITARY.

910 — REDUCING, BY THE SYSTEM, AN ORIGINAL GATE COUNT OF THE ORIGINAL UNITARY BY MERGING TERMS OF THE ORIGINAL UNITARY USING A GATE REDUCTION PROCESS COMPRISING A GENERALIZED TRAVELLING SALESMAN PROBLEM (GTSP), A MAXIMUM INDEPENDENT SET PROBLEM (MISP), OR A MINIMUM FEEDBACK VERTEX SET PROBLEM (MFVSP).

912 — GENERATING, BY THE SYSTEM, AN APPROXIMATING UNITARY FROM THE ORIGINAL UNITARY, THE APPROXIMATING UNITARY BASED ON A SYMMETRY WITH THE ORIGINAL UNITARY AND OMITTING THE SELECTED OPERATOR OF THE EXPONENTIATED SUM OF OPERATORS COMPRISED BY THE ORIGINAL UNITARY.

914 — GENERATING, BY THE SYSTEM, THE APPROXIMATING UNITARY BASED ON THE PRIORITIZATION.

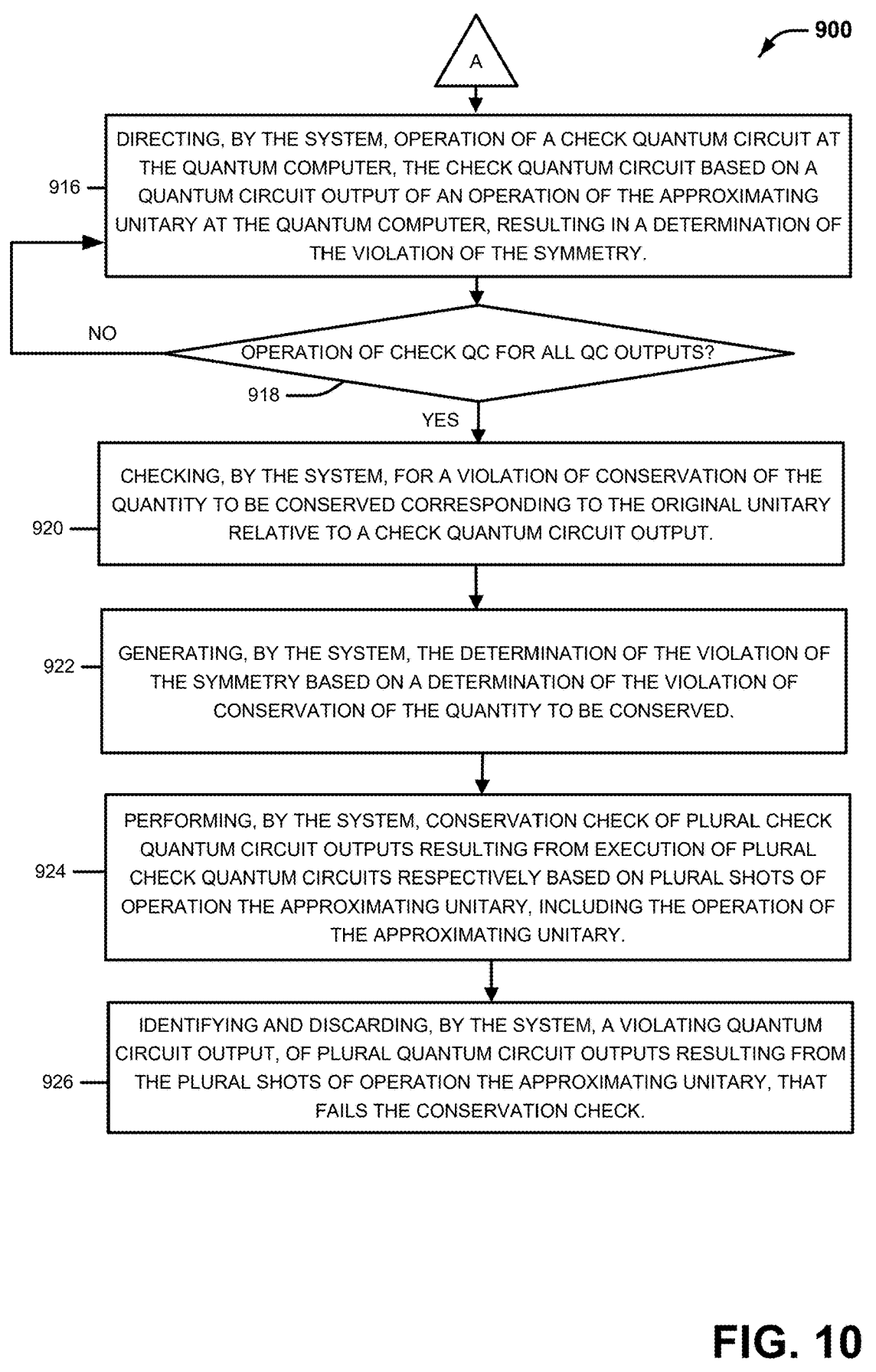

916 — DIRECTING, BY THE SYSTEM, OPERATION OF A CHECK QUANTUM CIRCUIT AT THE QUANTUM COMPUTER, THE CHECK QUANTUM CIRCUIT BASED ON A QUANTUM CIRCUIT OUTPUT OF AN OPERATION OF THE APPROXIMATING UNITARY AT THE QUANTUM COMPUTER, RESULTING IN A DETERMINATION OF THE VIOLATION OF THE SYMMETRY.

NO

918 — OPERATION OF CHECK QC FOR ALL QC OUTPUTS?

YES

920 — CHECKING, BY THE SYSTEM, FOR A VIOLATION OF CONSERVATION OF THE QUANTITY TO BE CONSERVED CORRESPONDING TO THE ORIGINAL UNITARY RELATIVE TO A CHECK QUANTUM CIRCUIT OUTPUT.

922 — GENERATING, BY THE SYSTEM, THE DETERMINATION OF THE VIOLATION OF THE SYMMETRY BASED ON A DETERMINATION OF THE VIOLATION OF CONSERVATION OF THE QUANTITY TO BE CONSERVED.

924 — PERFORMING, BY THE SYSTEM, CONSERVATION CHECK OF PLURAL CHECK QUANTUM CIRCUIT OUTPUTS RESULTING FROM EXECUTION OF PLURAL CHECK QUANTUM CIRCUITS RESPECTIVELY BASED ON PLURAL SHOTS OF OPERATION THE APPROXIMATING UNITARY, INCLUDING THE OPERATION OF THE APPROXIMATING UNITARY.

926 — IDENTIFYING AND DISCARDING, BY THE SYSTEM, A VIOLATING QUANTUM CIRCUIT OUTPUT, OF PLURAL QUANTUM CIRCUIT OUTPUTS RESULTING FROM THE PLURAL SHOTS OF OPERATION THE APPROXIMATING UNITARY, THAT FAILS THE CONSERVATION CHECK.

FIG. 10

APPROXIMATE QUANTUM COMPILING WITH ERROR MITIGATION

BACKGROUND

The subject disclosure relates to quantum computing systems and more specifically to reduction in gate count of a quantum operation to be operated at a quantum system based on approximate quantum compiling with subsequent error mitigation.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments, systems, computer-implemented methods, apparatuses and/or computer program products described herein can provide for reducing gate count of an original unitary to be executed at a quantum computer, in a manner that introduces checkable symmetry errors, generally discards operators and/or shots failing a conservation check, and/or approximates the original unitary.

In accordance with an embodiment, a system can comprise a memory that stores computer executable components, and a processor that executes the computer executable components stored in the memory, wherein the computer executable components comprise an approximating component that generates an approximating unitary from an original unitary, the approximating unitary based on a symmetry of the original unitary and omitting a selected operator of an exponentiated sum of operators comprised by the original unitary, and a checking component that directs operation of a check quantum circuit at a quantum computer, the check quantum circuit based on a quantum circuit output of an operation of the approximating unitary at the quantum computer, resulting in a determination of a violation of the symmetry.

In accordance with another embodiment, a computer-implemented method can comprise generating, by a system operatively coupled to a processor, an approximating unitary from an original unitary, the approximating unitary based on a symmetry of the original unitary and omitting a selected operator of an exponentiated sum of operators comprised by the original unitary, and directing, by the system, operation of a check quantum circuit at a quantum computer, the check quantum circuit based on a quantum circuit output of an operation of the approximating unitary at the quantum computer, resulting in a determination of a violation of the symmetry.

In accordance with still another embodiment, a computer program product, facilitating a process to reduce a gate count of a quantum operation at a quantum computer, can comprise a computer readable storage medium having program instructions generate, by the processor, an approximating unitary from an original unitary, the approximating unitary based on a symmetry of the original unitary and omitting a selected operator of an exponentiated sum of operators comprised by the original unitary, and direct, by the processor, operation of a check quantum circuit at a quantum computer, the check quantum circuit based on a quantum circuit output of an operation of the approximating unitary at the quantum computer, resulting in a determination of a violation of the symmetry.

A benefit of the system, computer-implemented method and/or computer program product can be an ability to provide a process for reducing gate count associated with quantum operation of an original unitary at a quantum system based on approximate quantum compiling. Using the approximate quantum compiling, an approximating unitary can be generated employing operators that knowingly resulting in checkable errors, where the errors are symmetry or conservation violating errors. Operators that would result in non-symmetry-violating errors can be avoided where possible, based on various approximating processes employed by the one or more embodiments. The accepted symmetry or conservation violating errors can be identified, and shots having outputs comprising the errors discarded, allowing for error mitigation of an overall result of operation of an approximating unitary based on the original unitary.

Another benefit of the system, computer-implemented method and/or computer program product can be an ability to provide a process to analyze and prioritize operators of the original unitary in a manner allowing for discarding one or more operators of an exponentiated sum of operators comprised by the original unitary and/or for reordering or merging two or more such operators using a plurality of different methods known to those having ordinary skill in the art. That is, various such different methods can be employed allowing for a user entity to choose a best suited, most efficient, and/or most familiar one or more different methods to reduce a gate count employed for operating of the original unitary, resulting in an approximating unitary.

For example, in one or more cases, the one or more embodiments described herein can be employed to prioritize first operators that would possibly and/or knowingly result in conservation errors and/or symmetry errors over second operators that would possibly and/or knowingly result in non-symmetry-violating errors. As used herein, symmetry can imply that a quantity is being conserved. Accordingly, symmetry can correspond to conservation of a quantity to be conserved (e.g., particle count), where violation of symmetry can correspond to violation of conservation.

Yet another benefit of the system, computer-implemented method and/or computer program product can be an automatic reduction in gate count for operating a requested original unitary using the system, computer-implemented method and/or computer program product. That is the system, computer-implemented method and/or computer program product can employ automatic processes for at least one or more of identifying an original unitary and a quantity to be conserved relative to the original unitary, identifying operators of a sum of exponentiated operators of the original unitary, prioritizing the operators based on likelihood to cause symmetry or conservation errors versus non-symmetry or non-conservation errors, discarding of one or more operators likely to cause non-symmetry or non-conservation errors, reordering and/or merging of operators, generating of an approximating unitary based on the previous processes, directing of operation of the approximating unitary at a quantum computer, determining of a quantum circuit output, generating and directing of a check quantum circuit, evaluating an check quantum circuit output, determining a violation of the symmetry based on the check quantum circuit output, and/or determining a quantum circuit output to drop based on the evaluating, without being limited thereto.

DESCRIPTION OF THE DRAWINGS

FIG. 4 provides an example table of approximate fermionic excitations that can be employed by the non-limiting system of FIG. 2 to alter operators of an exponentiated sum of operators of an original unitary, in accordance with one or more embodiments described herein.

FIG. 7 provides an example table of numbers of CNOT gates and ancillae qubit counts sufficient to achieve chemical accuracy for various approximations and mitigation settings, related to quantum circuit output of operation of the approximating unitary, and that can be employed by the non-limiting system of FIG. 2, in accordance with one or more embodiments described herein.

FIG. 8 illustrates a flow diagram of one or more processes that can be performed by the non-limiting system of FIG. 1, to provide a process for reduction in gate count of a quantum unitary to be operated at a quantum system based on approximate quantum compiling with subsequent error mitigation, in accordance with one or more embodiments described herein.

FIG. 9 illustrates a flow diagram of one or more processes that can be performed by the non-limiting system of FIG. 2, to provide a process for reduction in gate count of a quantum unitary to be operated at a quantum system based on approximate quantum compiling with subsequent error mitigation, in accordance with one or more embodiments described herein.

FIG. 10 illustrates a continuation of the flow diagram of FIG. 9 of one or more processes that can be performed by the non-limiting system of FIG. 2, in accordance with one or more embodiments described herein.

DETAILED DESCRIPTION

Figure 1:
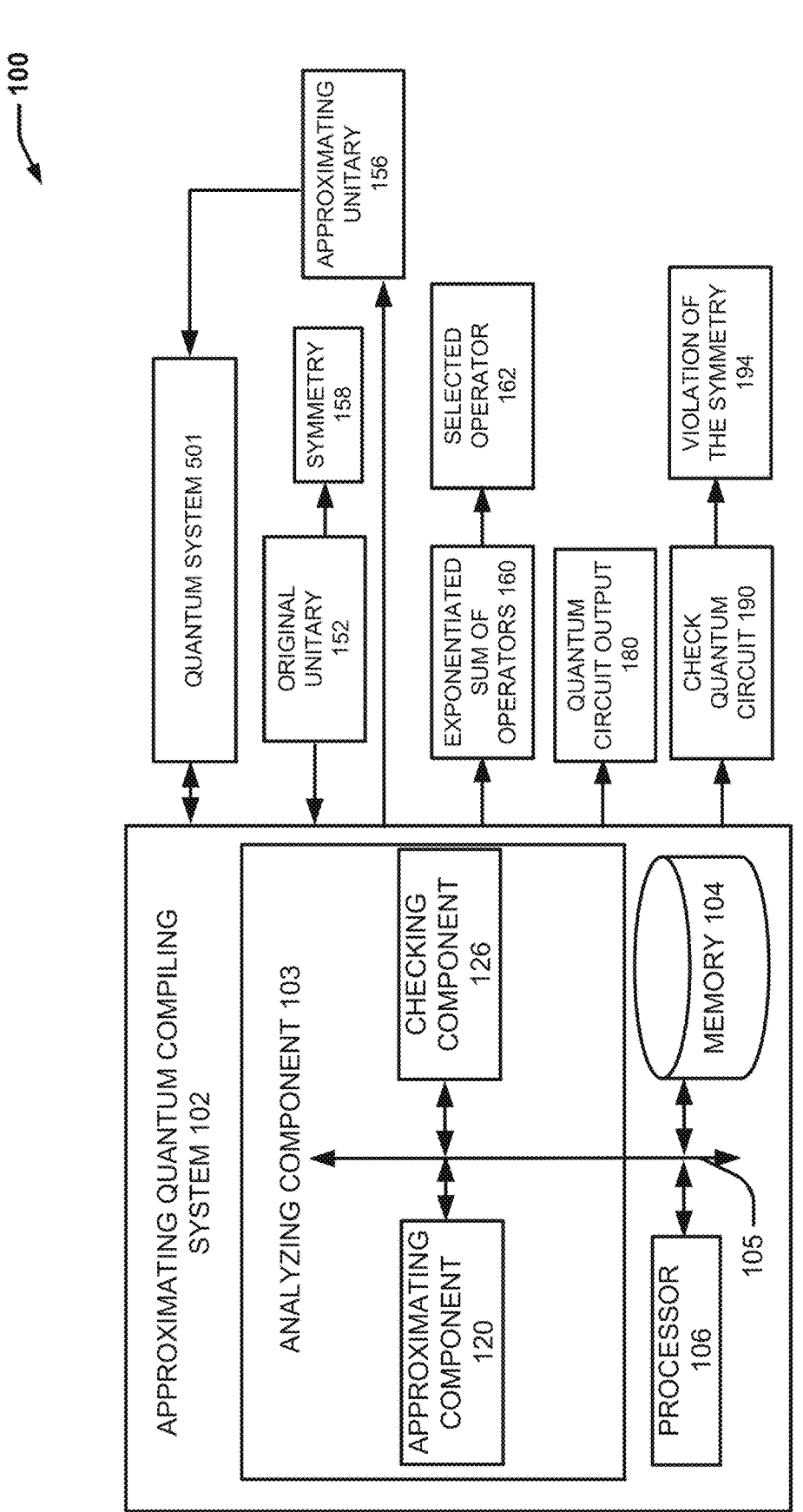
FIG. 1 illustrates a block diagram of an example, non-limiting system that can provide a process for reduction in gate count of a quantum unitary to be operated at a quantum system based on approximate quantum compiling with subsequent error mitigation, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As a brief summary, in practice, operation of a quantum circuit at a quantum computer, and/or operation of a quantum simulation, can involve operation of a quantity of gates. In one or more cases, a quantity of gates to be operated can be a limiting factor to operation of the quantum circuit and/or to operation of a desired number of shots related to the quantum circuit. As used herein, the term "shots" refers to repeat operations of a same and/or modified quantum circuit relative to an original quantum circuit that was operated. That is, operation of a gate at a quantum computer and/or quantum simulator can be associated with operation of one or more designated qubits, employed of system memory, employment of user entity labor, employment of a designated amount of energy and/or power, etc.

For example, operation of a quantum circuit at a quantum device and/or at a quantum simulator can be a time-intensive, energy-intensive, memory-intensive and/or user entity labor-intensive process. Additionally, and/or alternatively, a quantum device and/or simulator available for use in operating a quantum circuit can cause one or more other limiting factors based on the number of qubits available, qubit mapping available, access to the quantum device and/or quantum simulator, etc.

Moreover, operation of a quantum gate at a quantum device and/or quantum simulator can be inherently related to introduction of noise, and thus error, into the system being operated, thus resulting in some level of error introduced into a quantum circuit output resulting from the operation of the quantum gate at the quantum device and/or quantum simulator. Accordingly, reduction in gate count can correspond to reduction in such errors, in one or more cases Existing approaches to reduce one or more such limits on operation of a quantum circuit can involve one or more processes to compress quantum circuits in a manner than can minimally reduce a gate count to be employed. These one or more processes can be referred as exact processes that can employ information about a quantum system and/or about a quantum circuit to be operated to discard one or more gates without introducing additional error. Application of these one or more processes can be limited, such as only be able to be employed with certain gates, certain gate ordering, etc. In view of these deficiencies, it is desired to have a more broadly-applicable method for reduction of gate count To account for the one or more deficiencies, one or more frameworks discovered by the inventors and discussed herein can be employed for reducing gate count employed to operate a quantum circuit based on approximate compiling. That is, by generally approximately compiling a quantum circuit, employed a set of operators that approximately results in a similar quantum circuit output, a set of gates employed can be reduced as compared to operation of the original (non-approximated) quantum circuit. The approximate compiling is performed in such a way that knowingly introduces errors, such as symmetry and/or conservation errors, that can be identified, mitigated and/or discarded.

The approximate compiling can comprise one or more processes of identifying operators of an original quantum circuit, such as of an exponentiated set of operators of an original unitary of the original quantum circuit, based on a number of excitations to be employed. Additionally, and/or alternatively, the approximate compiling can comprise one or more processes of prioritizing operators that possibly and/or knowingly will result in a conservation error and/or symmetry error over operators that possibly and/or knowingly will result in non-conservation-violating errors or non-symmetry-violating errors. That is, a quantity to be conserved can be associated with a baseline inquiry on which an original quantum circuit is based. This quantity to be conserved can be a particle count, electron count or other number associated with the baseline inquiry. For example, a baseline inquiry can be related to a fermionic excitation problem.

Further, the approximate compiling can comprise one or more processes of rearranging, ordering and/or merging Pauli operators and/or other operators of the original unitary (e.g., of an exponentiated sum of operators of the original unitary), such as employing one or more processes to be discussed herein.

In association with the approximate compiling, an approximating unitary can be generated, having a reduced gate count as compared to the original unitary, which approximating unitary can be directed to be operated at a quantum device and/or quantum simulator. A quantum circuit output can be obtained.

In association with the operation of the approximating unitary, an error mitigation process can be performed. Based on the quantum circuit output, a check quantum circuit can be generated and directed to be operated at a quantum device and/or quantum simulator. The check quantum circuit can be employed to generally evaluate the quantum circuit output, checking for a violation of the quantity to be conserved. It is noted that a violation of the quantity to be conserved corresponds to a violation of a symmetry of the original unitary. In one or more embodiments, a quantity of gates employed to operate the approximating unitary (e.g., one shot thereof) in combination with a quantity of gates employed to operate a corresponding check quantum circuit can be less than a quantity of gates that would have been employed to operate the original unitary, prior to approximate compiling and subsequent error mitigation.

Accordingly, generally, the one or more frameworks discussed herein can provide for automatic reduction in gate count for operating a requested original unitary. That is a system, computer-implemented method and/or computer program product can employ automatic processes for at least one or more of identifying an original unitary and a quantity to be conserved relative to the original unitary, identifying operators of a sum of exponentiated operators of the original unitary, prioritizing the operators based on likelihood to cause symmetry or conservation errors versus non-symmetry or non-conservation errors, discarding of one or more operators likely to cause non-symmetry or non-conservation errors, reordering and/or merging of operators, generating of an approximating unitary based on the previous processes, directing of operation of the approximating unitary at a quantum computer, determining of a quantum circuit output, generating and directing of a check quantum circuit, evaluating an check quantum circuit output, determining a violation of the symmetry based on the check quantum circuit output, and/or determining a quantum circuit output to drop based on the evaluating, without being limited thereto.

Put another way, advantages of working with a smaller set of Pauli strings can include one or more of the following. When trotterized to implement the state preparation circuit on a quantum computer, each Pauli string contributes to additional quantum gates to be executed. Considering each quantum gate introduces error, the state may be prepared with higher fidelity. Another advantage can be that heuristic solvers used to optimize quantum circuits can become more amenable to better solutions, in that the size of the problem which scales with the number of Pauli strings would be smaller. To synthesize quantum circuits that implement a given sequence of matrix exponentiation of Pauli strings, various gate reduction methods described herein can be employed to generate a set of predetermined Clifford circuits $C_{ab}$ that implement Clifford operations $C_b C^{-1}{}_a$, where $C_a$ is an element of a predetermined set of Clifford operations that maps a Pauli string $P_a$ to a single-Z Pauli string and likewise for $P_b$, where $P_a$ and $P_b$ to denote the two Pauli strings whose individual exponentiations are to be implemented one after the other in sequence. The number of CNOT gates used to implement each of Cab is therefore known in advance. This can be combined with the various gate reduction procedures of, but not limited to, Maximum Independent Set Problem (MISP), Minimum Feedback Vertex Set Problem (MFVSP), and/or Generalized Traveling Salesperson Problem (GTSP).

As used herein, the term "data" can comprise metadata.

As used herein, the terms "entity," "requesting entity," "user entity," and "administrating entity" can refer to a machine, device, component, hardware, software, smart device, party, organization, individual and/or human.

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Figure 2:
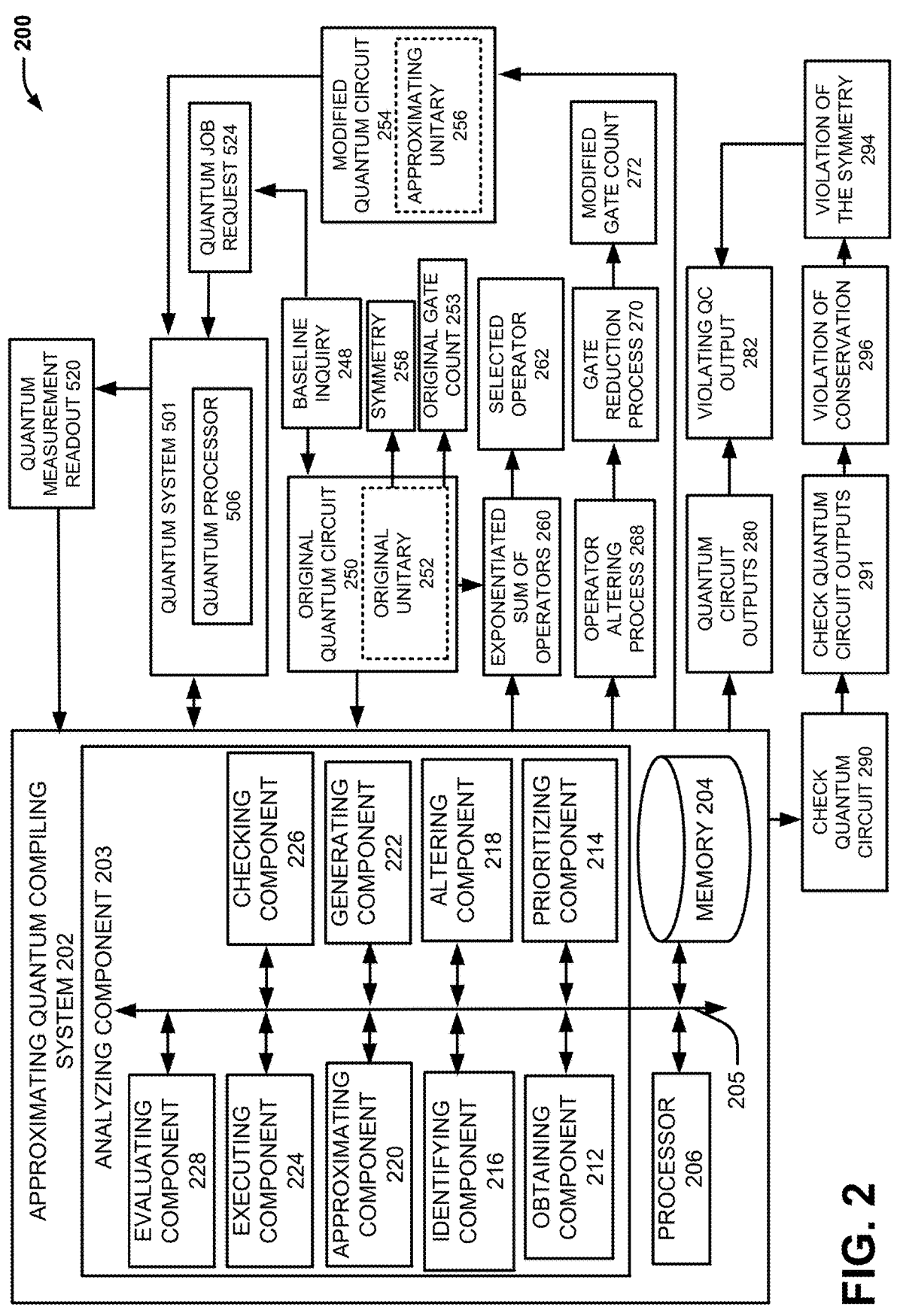
FIG. 2 illustrates a block diagram of another example, non-limiting system that can provide a process for reduction in gate count of a quantum unitary to be operated at a quantum system based on approximate quantum compiling with subsequent error mitigation, in accordance with one or more embodiments described herein.
Figure 11:
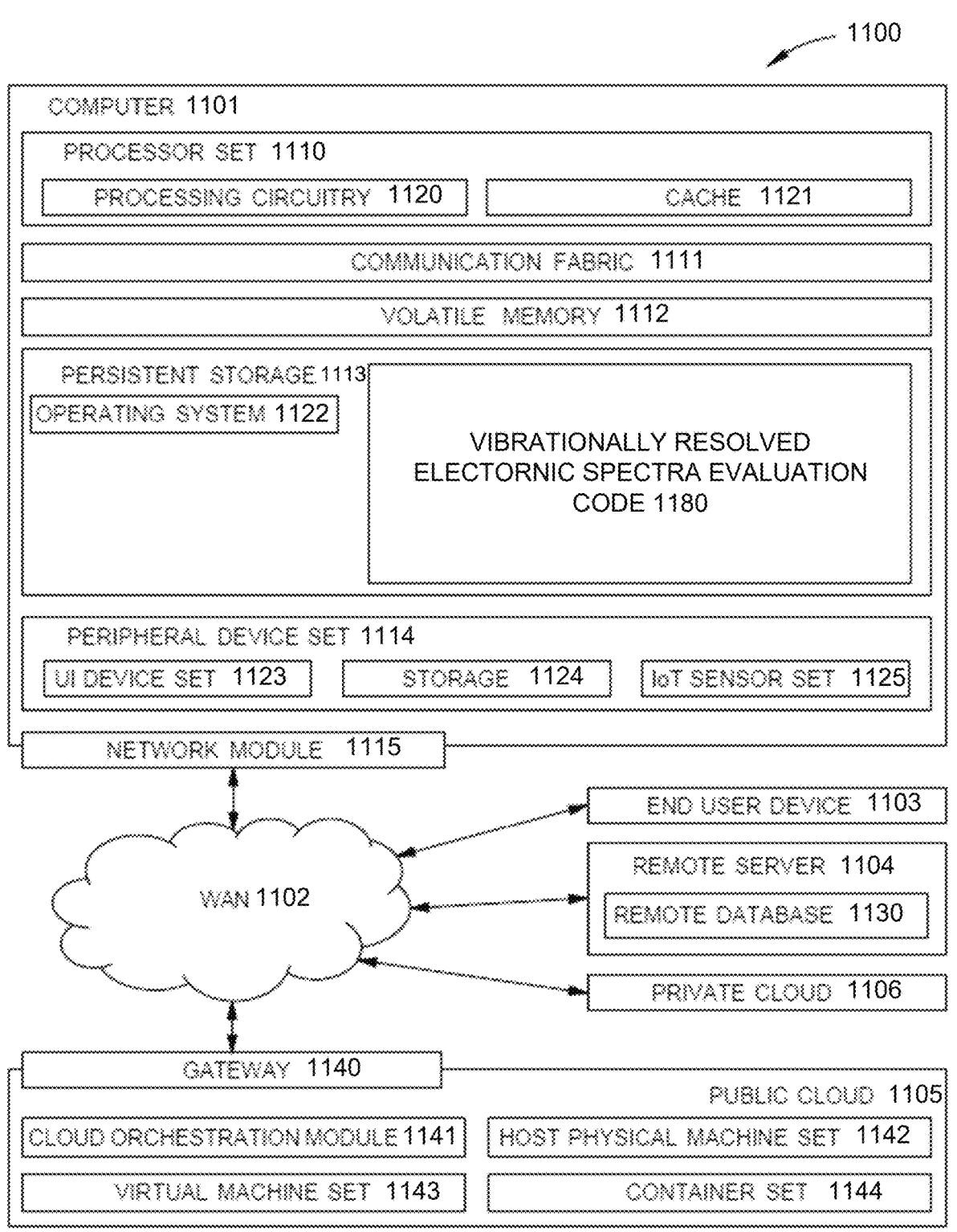
FIG. 11 illustrates a block diagram of an example, non-limiting, computer environment in accordance with one or more embodiments described herein.

For example, in one or more embodiments, the non-limiting systems 100 and/or 200 illustrated at FIGS. 1 and 2, and/or systems thereof, can further comprise one or more computer and/or computing-based elements described herein with reference to a computing environment, such as the computing environment 1100 illustrated at FIG. 11. In one or more described embodiments, computer and/or computing-based elements can be used in connection with implementing one or more of the systems, devices, components and/or computer-implemented operations shown and/or described in connection with FIGS. 1 and/or 2 and/or with one or more other figures described herein.

Figure 5:
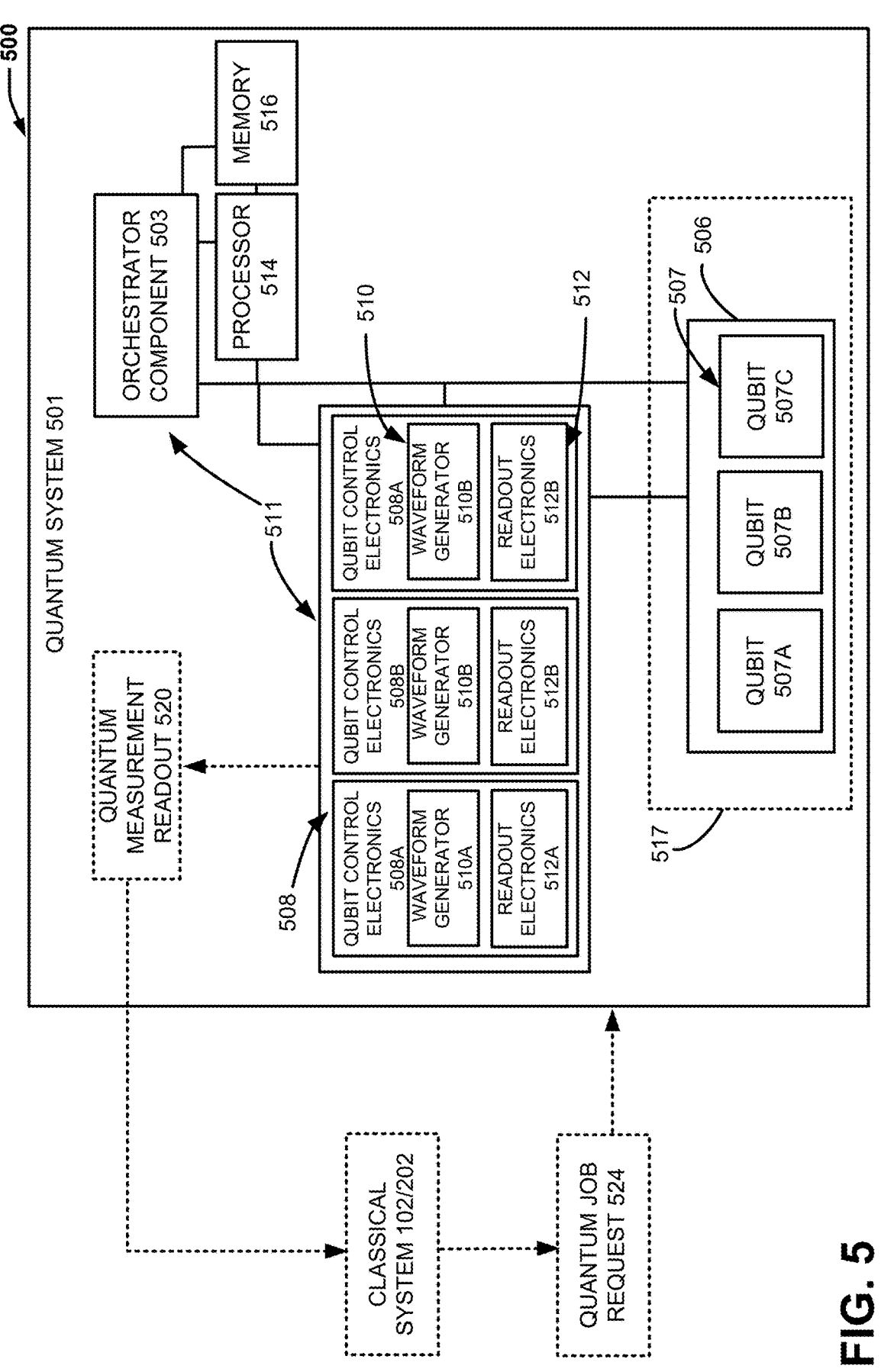
FIG. 5 illustrates a block diagram of a quantum system that can be employed in connection with the non-limiting systems of FIGS. 1 and 2, in accordance with one or more embodiments described herein.

Turning now in particular to one or more figures, and first to FIG. 1, the figure illustrates a block diagram of an example, non-limiting system 100 that can provide a process to reduce a gate count of a quantum operation at a quantum computer using both a classical approximating quantum compiling system 102 and a quantum system 501 (FIG. 5).

That is, the non-limiting system 100 can comprise the approximating quantum compiling system 102 and the quantum system 501, to be described in detail below. It is noted that the approximating quantum compiling system 102 is only briefly described relative to FIG. 1 to provide but a lead-in to description of a more complex and/or more expansive approximating quantum compiling system 202 as illustrated at FIG. 2. Further detail regarding processes that can be performed by one or more embodiments described herein will be provided below relative to the non-limiting system 200 of FIG. 2.

Still referring to FIG. 1, the approximating quantum compiling system 102 can comprise at least a memory 104, bus 105, processor 106, approximating component 120 and/or checking component 126. Using these components and the quantum system 301, the approximating quantum compiling system 102 can provide for generation of an approximating unitary 156 based on an original unitary 152, with an intent to maintain a symmetry of the original unitary 152 relative to operation of the approximating unitary 156, such as by using a check process (e.g., an error mitigation process checking for a violation of the symmetry 194) that can be performed at least partially by the checking component 126.

Generally, the approximating component 120 can generate an approximating unitary 156 from an original unitary 152, the approximating unitary 156 being based on a symmetry 158 of the original unitary 152 and omitting a selected operator 162 of an exponentiated sum of operators 160 comprised by the original unitary 152.

The checking component 126 can generally direct operation of a check quantum circuit 190 at a quantum computer (e.g., quantum system 501), the check quantum circuit 190 being based on a quantum circuit output 180 of an operation of the approximating unitary 156 at the quantum computer or another quantum computer, resulting in a determination of a violation of the symmetry 194. This determination of violation of the symmetry 194 can be employed to mitigate error introduced by operation of the approximating unitary 156, instead of operation of the original unitary 152. In this way, errors can be mitigated while also reducing gate count employed to operate the original unitary 152 instead as the approximating unitary 156.

In one or more embodiments, the approximating component 120 and/or checking component 126 can be implemented independently, without the other of the approximating component 120 and/or checking component 126. Additionally and/or alternatively, the approximating component 120 and/or checking component 126 can be comprised by an analyzing component 103, the analyzing component 103 can perform one or more of the above-described functions of the approximating component 120 and/or checking component 126, and/or the approximating component 120 and/or checking component 126 can be omitted with the analyzing component 103 performing one or more of the above-described functions of the omitted approximating component 120 and/or checking component 126.

In general, the non-limiting system 100 can employ any suitable method of communication (e.g., electronic, communicative, internet, infrared, fiber, etc.) to provide communication between the classical system 102 and the quantum system 501.

As a summary, referring next briefly to FIG. 8, illustrated is a flow diagram of an example, non-limiting method 800 that can provide a process for reduction in gate count of a quantum unitary to be operated at a quantum system based on approximate quantum compiling with subsequent error mitigation, in accordance with one or more embodiments described herein, such as the non-limiting system 100 of FIG. 1. Repetitive description of like elements and/or processes employed in respective embodiments is omitted for sake of brevity.

At 802, the non-limiting method 800 can comprise generating, by a system operatively coupled to a processor (e.g., approximating component 120 coupled to processor 106), an approximating unitary (e.g., approximating unitary 156) from an original unitary (e.g., original unitary 152), the approximating unitary being based on a symmetry (e.g., symmetry 158) of the original unitary and omitting a selected operator (e.g., selected operator 162) of an exponentiated sum of operators (e.g., exponentiated sum of operators) 160 comprised by the original unitary.

At 804, the non-limiting method 800 can comprise directing, by the system (e.g., checking component 126), a check quantum circuit (e.g., check quantum circuit 190) at a quantum computer (e.g., quantum system 501), the check quantum circuit being based on a quantum circuit output (e.g., quantum circuit output 180 or qc output 180) of an operation of the approximating unitary at the quantum computer or another quantum computer, resulting in a determination of a violation of the symmetry (e.g., violation of the symmetry 194).

At 806, the non-limiting method 800 can comprise determining, by the system (e.g., checking component 126), whether execution of another check quantum circuit is to be directed relative to another quantum circuit output other than the quantum circuit output. If yes, the non-limiting method 800 can proceed back to step 804. If not, the non-limiting method 800 can end.

Turning next to FIG. 2, a non-limiting system 200 is illustrated that can comprise an approximating quantum compiling system 202. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

Generally, the non-limiting system 200 can facilitate a process to reduce a gate count of a quantum operation at a quantum computer using both a classical approximating quantum compiling system 202 and the quantum system 501 (FIG. 5).

Turning first to the approximating quantum compiling system 202, one or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The approximating quantum compiling system 202 can be associated with, such as accessible via, a cloud computing environment.

The approximating quantum compiling system 202 can comprise a plurality of components. The components can comprise a memory 204, processor 206, bus 205, obtaining component 212, prioritizing component 214, identifying component 216, altering component 218, approximating component 220, generating component 222, executing component 224, checking component 226 and/or evaluating component 228. Using these components, and using operation of the quantum system 501, the non-limiting system 200 generally can provide one or more quantum measurement readouts 520 that can be employed, by the one or more embodiments, to determine one or more quantum circuit outputs 280, such as expectation values, which in turn can be employed, by the one or more embodiments, to generate and direct operation of one or more check quantum circuits 290, resulting in determination of one or more errors.

That is, the obtaining component 212, prioritizing component 214, identifying component 216, altering component 218, approximating component 220, generating component 222, executing component 224, checking component 226 and/or evaluating component 228 can operate at the classical system 202 of the non-limiting system 200. One or more quantum circuits (e.g., modified quantum circuits 254 and/or check quantum circuits 290) can be executed by the quantum system 501. In one or more other embodiments, one or more processes performed by any one or more of the obtaining component 212, prioritizing component 214, identifying component 216, altering component 218, approximating component 220, generating component 222, executing component 224, checking component 226 and/or evaluating component 228 can be performed at the quantum system 501.

Discussion first turns briefly to the processor 206, memory 204 and bus 205 of the approximating quantum compiling system 202. For example, in one or more embodiments, the approximating quantum compiling system 202 can comprise the processor 206 (e.g., computer processing unit, microprocessor, classical processor, quantum processor and/or like processor). In one or more embodiments, a component associated with approximating quantum compiling system 202, as described herein with or without reference to the one or more figures of the one or more embodiments, can comprise one or more computer and/or machine readable, writable and/or executable components and/or instructions that can be executed by processor 206 to provide performance of one or more processes defined by such component and/or instruction. In one or more embodiments, the processor 206 can comprise the obtaining component 212, prioritizing component 214, identifying component 216, altering component 218, approximating component 220, generating component 222, executing component 224, checking component 226 and/or evaluating component 228.

In one or more embodiments, the approximating quantum compiling system 202 can comprise the computer-readable memory 204 that can be operably connected to the processor 206. The memory 204 can store computer-executable instructions that, upon execution by the processor 206, can cause the processor 206 and/or one or more other components of the approximating quantum compiling system 202 (e.g., obtaining component 212, prioritizing component 214, identifying component 216, altering component 218, approximating component 220, generating component 222, executing component 224, checking component 226 and/or evaluating component 228) to perform one or more actions. In one or more embodiments, the memory 204 can store computer-executable components (e.g., obtaining component 212, prioritizing component 214, identifying component 216, altering component 218, approximating component 220, generating component 222, executing component 224, checking component 226 and/or evaluating component 228).

The approximating quantum compiling system 202 and/or a component thereof as described herein, can be communicatively, electrically, operatively, optically and/or otherwise coupled to one another via a bus 205. Bus 205 can comprise one or more of a memory bus, memory controller, peripheral bus, external bus, local bus, quantum bus and/or another type of bus that can employ one or more bus architectures. One or more of these examples of bus 205 can be employed.

In one or more embodiments, the approximating quantum compiling system 202 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the approximating quantum compiling system 202 and/or of the non-limiting system 200 can reside in the cloud, and/or can reside locally in a local computing environment (e.g., at a specified location).

In general, the non-limiting system 200 can employ any suitable method of communication (e.g., electronic, communicative, internet, infrared, fiber, etc.) to provide communication between the Approximating quantum compiling system 202 and the quantum system 501.

In addition to the processor 206 and/or memory 204 described above, the approximating quantum compiling system 202 can comprise one or more computer and/or machine readable, writable and/or executable components and/or instructions that, when executed by processor 206, can provide performance of one or more operations defined by such component and/or instruction.

Discussion next turns to the additional components of the approximating quantum compiling system 202 (e.g., obtaining component 212, prioritizing component 214, identifying component 216, altering component 218, approximating component 220, generating component 222, executing component 224, checking component 226 and/or evaluating component 228).

First, it is noted that in one or more embodiments, the obtaining component 212, prioritizing component 214, identifying component 216, altering component 218, approximating component 220, generating component 222, executing component 224, checking component 226 and/or evaluating component 228 can be implemented independently, without one or more other of the obtaining component 212, prioritizing component 214, identifying component 216, altering component 218, approximating component 220, generating component 222, executing component 224, checking component 226 and/or evaluating component 228. Additionally and/or alternatively, the obtaining component 212, prioritizing component 214, identifying component 216, altering component 218, approximating component 220, generating component 222, executing component 224, checking component 226 and/or evaluating component 228 can be comprised by a analyzing component 203, one or more of the below-described functions of the obtaining component 212, prioritizing component 214, identifying component 216, altering component 218, approximating component 220, generating component 222, executing component 224, checking component 226 and/or evaluating component 228 can be performed by the analyzing component 203, and/or the obtaining component 212, prioritizing component 214, identifying component 216, altering component 218, approximating component 220, generating component 222, executing component 224, checking component 226 and/or evaluating component 228 can be omitted with the analyzing component 203 performing one or more of the below-described functions of the one or more omitted obtaining component 212, prioritizing component 214, identifying component 216, altering component 218, approximating component 220, generating component 222, executing component 224, checking component 226 and/or evaluating component 228.

Turning first to the obtaining component 212, this component can generally find, locate, select, receive, download, upload and/or otherwise obtain an original quantum circuit 250 that is requested to be operated at a quantum system, such as the quantum system 501. In one or more embodiments, the original quantum circuit 250 can be comprised by a quantum job request 524 that can be compiled in any suitable format. The quantum job request 524 can relate to a baseline inquiry 248. For example, a baseline inquiry 248 can comprise determination of a fermionic excitation, for example.

Figure 6:
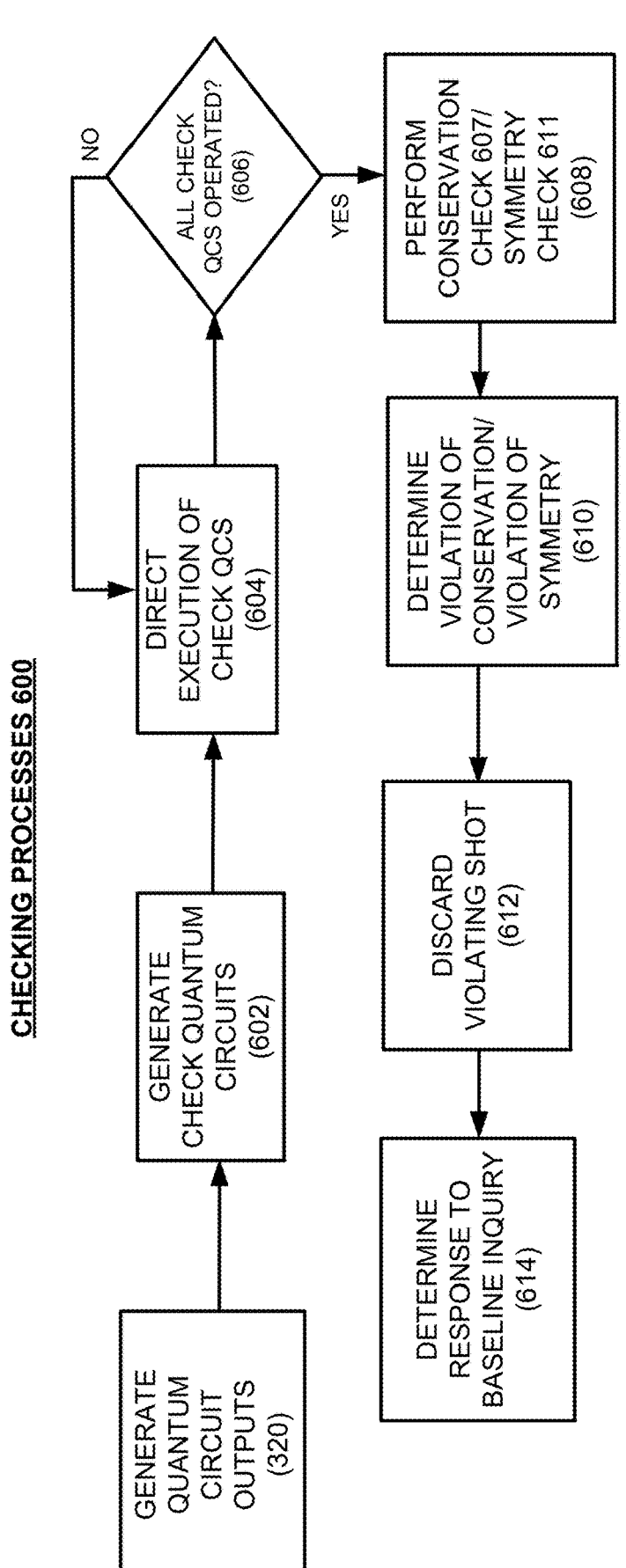
FIG. 6 provides a schematic flow diagram of checking processes that can be employed by the non-limiting system of FIG. 2 to check for conservation and/or symmetry errors related to operation of an approximating unitary at a quantum system, such as the quantum system of FIG. 5, in accordance with one or more embodiments described herein.

The original quantum circuit 250 can comprise an original unitary 252 that can be operated at a quantum system based on a gate count 253. The non-limiting system 200 can be employed to reduce that gate count to a modified gate count 272 through a first set of approximating processes 300 (FIG. 3) and a second set of checking processes 600 (FIG. 6). That is, the non-limiting system 200 can provide for approximate compiling, directing of quantum circuit execution, and error mitigation to allow for general operation of the original unitary 252 as an approximating unitary 256.

Figure 3:
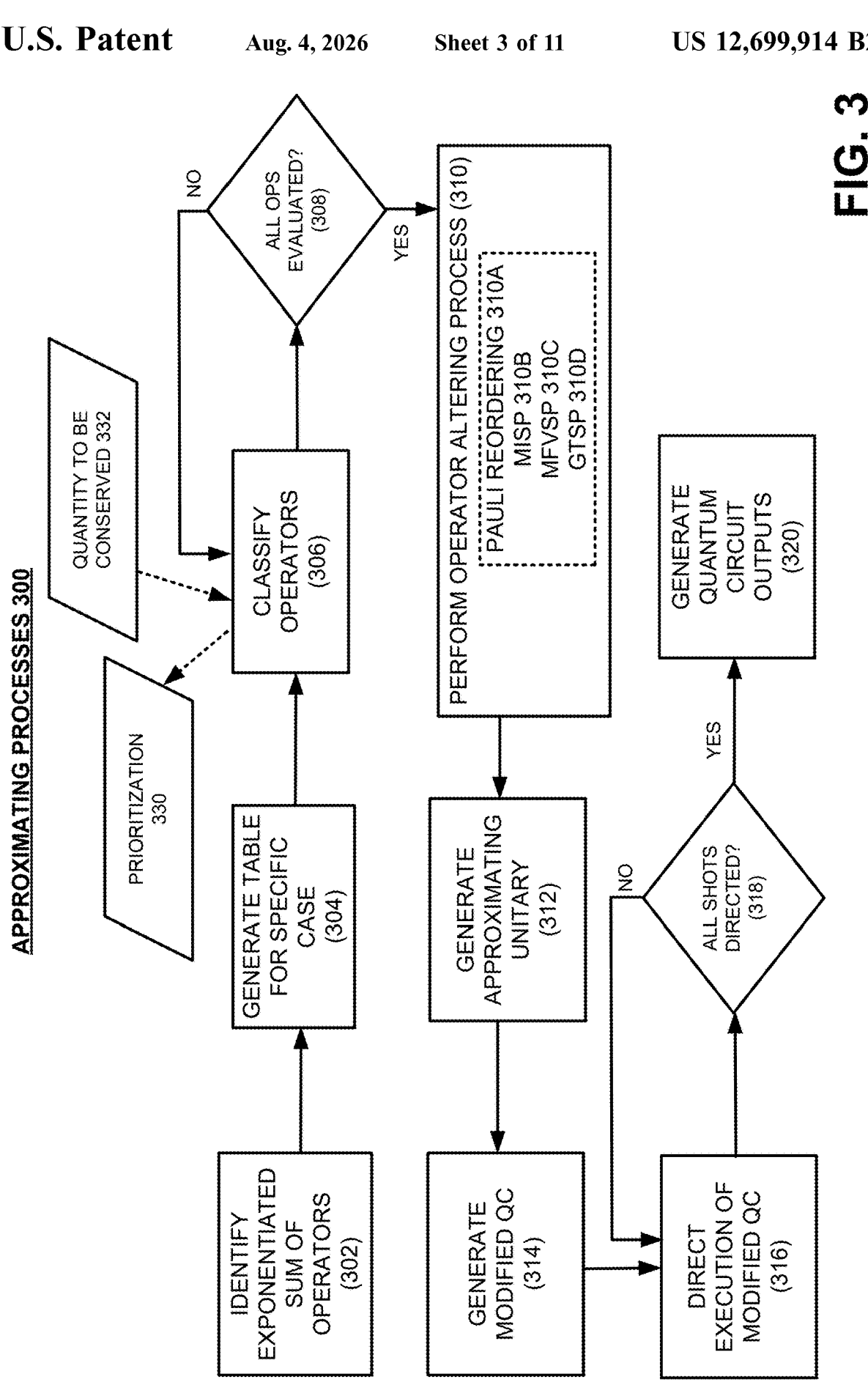
FIG. 3 provides a schematic flow diagram of approximating processes that can be employed by the non-limiting system of FIG. 2 to generate an approximating unitary, in accordance with one or more embodiments described herein.

Turning now to FIG. 3 in addition to also still referring to FIG. 2, upon identifying an original unitary 252, the prioritizing component 214 can identify (e.g., map) operators of an exponentiated sum of operators 260 comprised by the original unitary 252 (e.g., step 302 at FIG. 3). This identifying can comprise breaking down the original unitary 252 into its operator elements and can employ any data in any suitable format from the quantum job request 524.

In association therewith, the prioritizing component 214 can perform one or more processes to aid in compressing the original unitary 252, allowing for subsequent generation of the approximating unitary 256 by the generating component 222.

For example, the prioritizing component 214 can generally prioritize operators (e.g., step 306) of the exponentiated sum of operators 260 based on whether or not use of such operators will likely introduce and/or will introduce one or more types of errors. In one or more examples, the prioritizing component 214 can generate a prioritization 330 based on a quantity to be conserved 332. The quantity to be conserved 332 can be specifically related to the original quantum circuit 250 and/or to the baseline inquiry 248, such as being a particle count, such as an electron count that is to be conserved as a result of execution of a quantum circuit. The quantity to be conserved 332 can correspond to and/or define the symmetry 258 of the original unitary. That is, conservation of the quantity to be conserved 332 can result in an answer that accurately corresponds to the baseline inquiry 248.

In one or more example, the prioritization 330 can be of first operators, of the exponentiated sum of operators 260, that are determined to result in a violation of the symmetry 294, over second operators, of the exponentiated sum of operators 260, that are determined to result in one or more non-symmetry violating errors. As will be described below, the checking processes 600 can be employed to identify, discard and/or mitigate symmetry-violating errors, but are not appropriate for identifying, discarding and/or mitigating non-symmetry violating errors. As noted above, symmetry violation corresponds to conservation violation (e.g., a non-conservation of the quantity to be conserved 332).

Based on this prioritization 330, one or more selected operators 262 can be identified, such as by the identifying component 216 at step 308. This can be based on determining, by the identifying component 216, that an operation of the selected operator 262 at a quantum computer (e.g., quantum system 501) would result in a violation of conservation 296 of the quantity to be conserved 332 corresponding to the original unitary 252. It is noted that if the original unitary 252 comprises N summed operators in an exponential, up to N–1 of these N summed operators can be dropped. In one or more cases, dropping more operators corresponds to a shorter approximating unitary 256 at the cost of lower overlap with the original unitary 252. In one or more cases, if the dropped operators (e.g., selected operators 262) violate the symmetry 258 (e.g., result in some quantity not being conserved, other than the quantity being conserved 332), this can be acceptable in view of use of the check quantum circuit 290 and associated checking processes 600 (FIG. 6).

For another example, the prioritizing component 214 can generally classify operators (e.g., step 306) as being single excitation operators, double excitation operators or operators to not be compressed.

In one or more cases, this can be facilitated by generating and/or employing a table for a specific case of operators related to the original unitary 252 (e.g., step 304). For example, an error bit string can introduce interactions, such as undesirable interactions of |BitString><BitString|, |BitString><1'sComplement|, |1'sComplement><BitString|, and/or |1'sComplement><1'sComplement|. These error bit strings can result in errors such as 0000→|0000><0000|, |0000><1111|, |1111><0000|, and/or |1111><1111|.

For example, turning to FIG. 4, illustrated is an example table 400 of an example list of Pauli string combinations with absent number-conservation errors. That is, table 400 provides example operators and example errors that can be introduced through use of the operators related to a particular baseline inquiry 248 corresponding to a fermionic excitation problem. Related to such fermionic excitation problem, a unitary considered (e.g., original unitary 252) can be of a form $\exp(i\theta'(\Sigma_a P_a)/8)$, where $P_a$ are elements of a given combination and $\theta'$ are appropriately scaled $\theta$ by a factor of 4 or 2 for two- and four-string combinations, respectively. Unwanted, erroneous interactions introduced are $C|b_i><b_i|$, $C|\bar{b}_i><\bar{b}_i|$, $S|b_i><\bar{b}_i|$, and $S|\bar{b}_i><b_i|$, up to signs, where b are the bit strings reported in the "errors introduced" column and $\bar{b}$ is one's complement of b. It is noted that if keeping one string, all possible errors can incur, including number-conserving errors.

Relative to a generic table 400, e.g., applicable to a problem that is not specifically a fermionic excitation problem, different solvers, to be described below, can be employed for different classes of excitation terms, classified according to input quantum data compressibility (e.g., single excitation, double excitation, non-compressible). The compressed version of the excitation operators can admit approximation errors, such as illustrated at table 400.

Put another way, consider unitary U=exp(–iH) and operator A such that A commutes with H. If there is an approximate unitary U', where U'−U has interactions detectable via A-conservation check, U' can be implemented instead of U based on post-select on A.

As an example, considering a second quantized fermionic Hamiltonian relevant to chemistry as a baseline inquiry 248, $$H = \sum_{pq} \theta_{pq} a_p^\dagger a_q + \sum_{pqrs} a_p^\dagger a_q^\dagger a_r a_s + h.c.,$$

where $a_p$ is a fermionic annihilation operator and h.c. denotes a hermitian conjugate. H commutes with the total particle-number operator (e.g., the quantity to be conserved 332). As such, if the total particle number at the end of the implementation of an approximation of U can be computed, a user entity and/or an embodiment described herein can post-select only those computations that preserve the total particle number (e.g., as detailed below relative to the checking processes 600 of FIG. 6).

That is, if N qubits are used to encode the occupation of each level p by a fermion, the particle number operator can be implemented using at most log 2(N) ancilla qubits. An even more economical approach can be to partially compute the particle number, e.g., its d least significant bits, reducing both the number of gates used and the ancilla count.

Commonly used unitaries for these systems can be tailor-approximated to result in number violation errors only (e.g., steps 306 and 310 of FIG. 3). Consider a matrix exponentiation of a double-excitation operator minus its hermitian conjugate, as is existingly used in a simulation of quantum systems. Applying the Jordan Wigner transformation on the term exp($\theta a^\dagger_3 a^\dagger_2 a_1 a_0$−h.c.), a second term can be obtained as exp(−i$\theta$(XXXY+XXYX+YXYY+XYYY−YXXX−YYXY−YYYX−XYXX)/8)=C|0011><0011|+C|1100><1100|−S|0011><1100|+S|1100><0011|, where C:=cos($\theta$) and S:=sin($\theta$).

Consider now dropping all but one Pauli strings. It can be observed that additional excitation terms are introduced. Exact unitaries are to interact pairs of basis states with the same particle number (number of 0's and 1's), following number conservation. Note, however, that not every such pair is to be interacted. Note further that the approximating unitary 256 resulting can interact pairs with different particle numbers, violating number conservation. Since the number violation can be detected using the number conservation check (e.g., resulting in a determination of violation of conservation 296), there then can be an opportunity to keep more than one Pauli string, but still drop some. This can systematically eliminate unwanted interactions between pairs of basis states that conserve the quantity to be conserved 332, while deliberately allowing for the number non-conserving interactions that are to be post-selected out with the number conservation check, as will be described below relative to FIG. 6.

For example, see table 400 of FIG. 4, for good combinations of Pauli strings that avoid un-checkable number-conservation errors (e.g., violations of conservation 296) in the double-excitation unitary.

In one or more cases, the different approximations that can incur different violation errors can be associated by the Hamming-weight deviation W=$\min_i$(|2−w($b_i$)|), where $b_i$ are the basis-state bit strings that participate in the erroneous interactions, introduced by the approximations. For example, all two-string combinations reported in table 400 can admit W=1. The four-string combinations in table 400 can admit W=2. The deviation weight W can be indicative of the degrees of the number violation errors introduced by the various approximations.

Turning back to FIG. 3, at step 308, the prioritizing component 214 can determine if all operators of the exponentiated sum of operators 260 have been evaluated. If not, additional classification at step 306 can be performed. If yes, one or more altering processes 310 can be performed by the altering component 218.

In one or more cases, an altering process 310 can comprise a reordering of Pauli operators 310A.

Additionally, and/or alternatively, an altering process 310 can comprise a gate reduction process 270 such as a generalized travelling salesperson problem (GTSP) 310D, a maximum independent set problem (MISP) 310B, and/or a minimum feedback vertex set problem (MFVSP) 310C.

At step 312, based on the steps 302, 304, 306, 308 and/or 310, the generating component can generate an approximating unitary 256, such as employing the remaining operators (e.g., non-discarded operators, merged operators, non-merged operators) from the steps 302, 304, 306, 308 and/or 310.

It is noted that these approximating process 300 (e.g., 302-312) can be performed for plural original unitaries 252, thus resulting in plural approximating unitaries 256 relative to a single original quantum circuit 250. In one or more embodiments, one or more approximating processes 300 can be performed relative to one original unitary 252 at least partially in parallel with one or more approximating processes 300 being performed relative to another original unitary 252.

At step 314, the generating component can generate a modified quantum circuit 254 including the approximating unitary 256 and/or including two or more approximating unitaries 256.

At step 316, the executing component 224 can direct execution of the approximating unitary 256 (and thus can direct execution of the respective modified quantum circuit 254) at a quantum system, such as the quantum system 501, resulting in a quantum measurement readout 520. In one or more cases, the approximating quantum compiling system 202 (e.g., executing component 224 and/or evaluating component 228) can transform the quantum measurement readout 520 into one or more quantum circuit outputs 280, such as one or more expectation values related to the quantum job request 524/baseline inquiry 248.

Next, prior to discussion of use of the quantum measurement readouts 520 for generation of one or more check quantum circuits 290 and/or operation of one or more checking processes 600 of FIG. 6, discussion first turns to a general description of an exemplary quantum system 501 that can be operated to provide execution of a modified quantum circuit 254 (and thus operation of the approximating unitary 256) and provision of the quantum measurement readouts 520 in connection with the classical system 202.

Turning to FIG. 5, one or more embodiments described herein can include one or more devices, systems and/or apparatuses that can provide a process to generate one or more waveforms or pulses for a quantum-based operation (e.g., using a quantum device), such as for operating one or more qubits of a quantum device. Accordingly, at FIG. 5, illustrated is a block diagram of an example, non-limiting system 500 that can at least partially facilitate such a process. While referring here to one or more processes, facilitations and/or uses of the non-limiting system 500, description provided herein, both above and below, also can be relevant to one or more other non-limiting systems described herein, such as the non-limiting systems 100 and/or 200.

As illustrated at FIG. 5, the non-limiting system 500 can comprise a quantum system 501 that can be employed with the classical systems 102/202 or separate from the classical systems 102/202.

Generally, the quantum system 501 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high-level components and/or functions. The quantum circuity can generate physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readouts 520, can be responsive to a quantum job request 524 and associated input data, which can be based at least in part on the input data, quantum functions and/or quantum computations (e.g., here comprising requested execution of modified quantum circuits 254 and/or check quantum circuits 290).

In one or more embodiments, the quantum system 501 can comprise components, such as an orchestrator component 503, a quantum processor 506, pulse component (e.g., a waveform generator 510) and/or a readout electronics 512 (e.g., readout component).

The quantum processor 506 can comprise one or more, such as plural, qubits 507. Individual qubits 507A, 507B and 507C, for example, can be fixed frequency and/or single junction qubits, such as transmon qubits.

In one or more embodiments, a readout resonator can be associated with, such as located with physical hardware defining a qubit 507.

In one or more embodiments, a memory 516 and/or processor 514 can be associated with the orchestrator component 503, where suitable. The processor 514 can be any suitable processor. The processor 514 can generate one or more instructions for controlling the one or more processes of the orchestrator component 503, such as for controlling one or more subordinate controllers (e.g., qubit control electronics 508).

The orchestrator component 503 can obtain (e.g., download, receive, search for and/or the like) a quantum job request 524 requesting execution of one or more quantum programs and/or requesting a physical qubit layout. The quantum job request 524 can be provided in any suitable format, such as a text format, binary format and/or another suitable format. In one or more embodiments, the quantum job request 524 can be obtained by a component other than of the quantum system 501, such as a by a component of the classical systems 102/202.

The orchestrator component 503 can determine mapping of one or more quantum logic circuits for executing a quantum program based on the quantum job request 524. In one or more embodiments, the orchestrator component 503 and/or quantum processor 506 can control the waveform generator 510 to generate one or more pulses, tones, waveforms and/or the like to affect one or more qubits 507, such as in response to the quantum job request 524.

In one or more embodiments, more than one orchestrator component 503 can be comprised by the quantum system 501. The one or more orchestrator components 503 can be employed to control one or more qubit control electronics 508. Thus, the one or more qubit control electronics 508A, 508B and/or 508C can be communicatively coupled to the one or more orchestrator components 503.

Qubit control electronics 508 can be employed by the quantum processor 506 and disposed within a room temperature environment external to the cryogenic environment 517, as illustrated. In one or more embodiments, one or more aspects of one or more qubit control electronics can be disposed within a cryogenic environment 517.

In one or more embodiments a qubit control electronics 508 can be provided per qubit 507. In one or more embodiments, a qubit control electronics 508 can be provided to communicate with more than one qubit 507 per that qubit control electronics 508.

In one or more embodiments, a qubit control electronics 508 can be and/or can comprise a qubit drive card (e.g., a waveform generator 510) and/or a qubit acquire card (e.g., readout electronics 512). In one or more embodiments, a qubit control electronics 508 can be and/or can comprise only one of a qubit drive card or a qubit acquire card. In one or more embodiments, a qubit control electronics 508 can comprise more than one qubit drive card and/or more than one qubit acquire card.

A waveform generator 510 generally can cause at least one qubit 507 of the quantum processor 506 to perform one or more quantum processes, calculations and/or measurements by creating a suitable electro-magnetic signal. For example, the waveform generator 510 can operate one or more qubit effectors, such as qubit oscillators, harmonic oscillators, pulse generators and/or the like to cause one or more pulses to stimulate and/or manipulate the state(s) of the one or more qubits 507 comprised by the quantum system 501. Indeed, a signal can be generated by the waveform generator 510 to affect one or more of the plurality of qubits 507.

In one or more embodiments, the waveform generator 510 can control application of such electro-magnetic signal by use of the various qubit control electronics 508.

The quantum processor 506 can be contained in a cryogenic environment, such as generated by a cryogenic environment 517, such as effected by a dilution refrigerator. Where one or more of the plurality of qubits 507 are superconducting qubits, cryogenic temperatures, such as about 4K or lower, can be employed for function of these one or more physical qubits 507.

The readout electronics 512 can comprise and/or be comprised by the acquire card. The readout electronics 512 and/or the acquire card can comprise an analog to digital converter (ADC) 515 that can be employed for the readout path of one or more qubits 507. The readout electronics 512, or at least a portion thereof, can be contained in a room temperature environment or the cryogenic environment 517, such as for reading a state, frequency and/or other characteristic of qubit, excited, decaying or otherwise. Accordingly, one or more elements of the readout electronics 512 also can be constructed to perform at such cryogenic temperatures.

In one or more embodiments, more than one cryogenic environment, such as more than one dilution refrigerator, can be comprised by the quantum system 501.

It is noted that one or more aspects of the aforementioned description can refer to operation of a single set of instructions run on a single qubit controller or set of qubit control electronics. However, scaling can be achieved. For example, instructions can be calculated, transmitted, employed and/or otherwise used relative to one or more qubits (e.g., non-neighbor qubits) in parallel with one another, one or more quantum circuits in parallel with one another, and/or one or more qubit mappings in parallel with one another.

Turning now back to FIG. 2, and now also to the checking processes 600 of FIG. 6, one or more error mitigation process will be described to account for the approximate compiling performed relative to the approximating processes 300 of FIG. 3.

Turning first to step 602 of FIG. 6, based on the quantum circuit output 280 for each shot of the approximating unitary 256 operated at the quantum system (e.g., quantum system 501), a quantum check circuit 290 can be generated based thereon. These check quantum circuits 290 can be generated in a manner employed to allow for detection of a violation of conservation 296 of the quantity to be conserved 332 based on check quantum circuit outputs 291 of operation of the check quantum circuits 290 at a quantum system (e.g., quantum system 501). For example, the check quantum circuits 290 can be generated in manners familiar to those having ordinary skill in the art. In but one example, a quantity to be conserved 332 of particle number can be checked with increasing level of precision using a Fourier adder circuit.

At step 604, the checking component 226 can direct execution of a check quantum circuit 290 at the quantum system (e.g., quantum system 501), resulting in an output of a measurement readout 520. The measurement readout 520 can be transformed, such as by the checking component 226 into one or more check quantum circuit outputs 291, such as expectation values.

At step 606, the checking component 226 can determine if all check quantum circuits 290 (e.g., check qcs 290) have been operated. If yes, a conservation check 607 can be performed at step 608. If not, execution of one or more additional check quantum circuits 290 can be directed by the checking component 226 at step 604.

At step 608, it is noted that a conservation check 607 can automatically result in a symmetry check 611. That is, a check for conservation of the quantity to be conserved 332 relative to a check quantum circuit output 291 inherently can comprise and/or is a symmetry check 611. This is because, as described above, a symmetry 258 corresponds to a conservation of the quantity to be conserved 332.

The conservation check 607/symmetry check 611 can be performed by the evaluating component 228. Based on the qubit info output by the quantum system 501 (e.g., comprised by the respective check quantum system outputs 291), the evaluating component 228 can determine if the particular shot of operation of the approximating unitary 256 upon which a particular quantum check circuit 290 was based comprises a violation of conservation 296, and thus comprises a violation of the symmetry 294 (e.g., step 610).

For instance, in a case of violation of particle number (e.g., particle number as the quantity to be conserved 332), the conservation check can involve checking, with a single ancilla qubit, a parity of the particle number, which refers to whether the particle number is odd or even. If the resulting particle number on that shot read out in the ancilla qubits is not correct, then that shot can be discarded (e.g., step 612). Using additional ancilla qubits, more precise information about the particle number can be determined, such as the particle number itself. In this case, if the value of the particle number on a particular shot does not match the known particle number that should be conserved, then that shot can be discarded (e.g., step 612).

For example, the evaluating component 228 can check for a violation of conservation 296 of the quantity to be conserved 332 corresponding to the original unitary 252 relative to a check quantum circuit output 291 of the operation of a check quantum circuit 290.

In one or more cases, the evaluating component 228 can generate a determination of a violation of the symmetry 294 based on a determination of the violation of conservation 296 of the quantity to be conserved 332.

For another example, the evaluating component 228 can perform a conservation check 607 of plural check quantum circuit outputs 291 resulting from execution of plural check quantum circuits 290 respectively based on plural shots of operation the approximating unitary 256. In one or more cases, the conservation check 607 can correspond to conservation of the quantity to be conserved 332 that corresponds to the baseline inquiry 248 upon which the original unitary 252 is based.

As noted above, at step 612, the evaluating component 228 can direct discarding of the violating quantum circuit (e.g., qc) output 282 associated with the violating shot (e.g., operation of the approximating unitary 256). In such case, the violating qc output 282 will not be employed by the evaluating component 228, or by another system, to determine a final output result in response to the baseline inquiry 248 (e.g., step 614). In this way, symmetry-violating/conservation-violating errors caused by use of the approximate compiling can be identified, discarded and/or mitigated.

Put another way, the evaluating component 228 can identify and/or discard a violating quantum circuit output 282, of plural quantum circuit outputs 280 resulting from the plural shots of operation the approximating unitary 256, that fails the conservation check 607.

Turning briefly to FIG. 7, illustrated is an example table 700 of numbers of CNOT gates and ancillae qubit counts sufficient to achieve chemical accuracy for various approximations and mitigation settings, related to quantum circuit output of operation of the approximating unitary for the specific example of fermionic excitation used both above and below. Table 700 specifically has been generated for preparing a ground state of the water molecule to chemical accuracy.

For example, at FIG. 7, min(W) indicates the minimum weight deviation W over all excitation terms considered. For no conservation, the CNOT count is provided in the format of A–B, where A is the number of CNOT counts used in the full simulation, and B is the number of CNOT gates in the last Clifford operator prior to measurement which can be folded in with the basis transformation of the measurement basis. For the rest, format A+C is employed, where A is the number of CNOT counts used in the full simulation, and C is the number of CNOT gates used for the check quantum circuit 290. $\Delta E$ is the energy difference from the full configuration interaction (FCI) energy rounded to $10-1_M H_A$. As used herein, FCI refers to a ground truth for the ground-state energy.

As a summary of the above-described approximate compiling/approximating processes 300 and/or error mitigation/checking processes 600, referring next to FIGS. 9 and 10, illustrated is a flow diagram. The flow diagram provides an example, non-limiting method 900 that can provide a process to generally reduce a gate count of a quantum operation at a quantum computer, in accordance with one or more embodiments described herein, such as the non-limiting system 200 of FIG. 2. While the non-limiting method 900 is described relative to the non-limiting system 200 of FIG. 2, the non-limiting method 900 can be applicable also to other systems described herein, such as the non-limiting system 100 of FIG. 1. Repetitive description of like elements and/or processes employed in respective embodiments is omitted for sake of brevity.

At 902, the non-limiting method 900 can comprise obtaining, by a system operatively coupled to a processor (e.g., obtaining component 212), an original unitary (e.g., original unitary 252).

At 904, the non-limiting method 900 can comprise generating, by the system (e.g., prioritizing component 214), a prioritization (e.g., prioritization 330) of first operators, of an exponentiated sum of operators (e.g., exponentiated sum of operators 260), that are determined to result in a violation of a symmetry (e.g., symmetry 258) of the original unitary, over second operators, of the exponentiated sum of operators, that are determined to result in one or more non-symmetry violating errors.

At 906, the non-limiting method 900 can comprise determining, by the system (e.g., prioritizing component 214), whether all operators, of the exponentiated sum of operators, have been evaluated. If yes, the non-limiting method 900 can proceed to step 908. If not, the non-limiting method 900 can proceed back to step 904 for continued prioritizing.

At 908, non-limiting method 900 can comprise identifying, by the system (e.g., identifying component 216), the selected operator based on determining (e.g., by the identifying component 216) that an operation of the selected operator at the quantum computer would result in the violation of conservation of the quantity to be conserved corresponding to the original unitary.

At 910, the non-limiting method 900 can comprise reducing, by the system (e.g., altering component 218), an original gate count (e.g., original gate count 253) of the original unitary by merging terms of the original unitary using a gate reduction process (e.g., gate reduction process 270) comprising a generalized travelling salesperson problem (GTSP), a maximum independent set problem (MISP), or a minimum feedback vertex set problem (MFVSP).

At 912, the non-limiting method 900 can comprise generating, by the system (e.g., approximating component 220), an approximating unitary (e.g., approximating unitary 256) from the original unitary, the approximating unitary based on a symmetry (e.g., symmetry 258) with the original unitary and omitting the selected operator of the exponentiated sum of operators comprised by the original unitary.

At 914, the non-limiting method 900 can comprise generating, by the system (e.g., approximating component 220), the approximating unitary based on the prioritization.

At 916, the non-limiting method 900 can comprise directing, by the system (e.g., checking component 226), operation of a check quantum circuit (e.g., check quantum circuit 290) at the quantum computer, the check quantum circuit based on a quantum circuit output (e.g., quantum circuit output 280) of an operation of the approximating unitary at the quantum computer, resulting in a determination of the violation of the symmetry.

At 918, the non-limiting method 900 can comprise determining, by the system (e.g., checking component 226), whether a respective check quantum circuit has been operated for all quantum circuit outputs (e.g., quantum circuit outputs 280). If yes, the non-limiting method 900 can proceed to step 920. If not, the non-limiting method 900 can proceed back to step 916 for continued directing.

At 920, the non-limiting method 900 can comprise checking, by the system (e.g., evaluating component 228), for a violation of conservation (e.g., violation of conservation 296) of the quantity to be conserved corresponding to the original unitary relative to a check quantum circuit output (e.g., check quantum circuit output 291) of the operation of the check quantum circuit.

At 922, the non-limiting method 900 can comprise generating, by the system (e.g., evaluating component 228), the determination of the violation of the symmetry based on a determination of the violation of conservation of the quantity to be conserved.

At 924, the non-limiting method 900 can comprise performing, by the system (e.g., evaluating component 228), conservation check (e.g., conservation check 607) of plural check quantum circuit outputs (e.g., check quantum circuit output 291) resulting from execution of plural check quantum circuits (e.g., check quantum circuits 290) respectively based on plural shots of operation the approximating unitary, including the operation of the approximating unitary.

In one or more embodiments, the conservation check corresponds to conservation of a quantity to be conserved that corresponds to a baseline inquiry (e.g., baseline inquiry 248) upon which the original unitary is based.

In one or more embodiments, the quantity to be conserved is a particle number to be conserved.

At 926, the non-limiting method 900 can comprise identifying and discarding, by the system, a violating quantum circuit output (e.g., violating quantum circuit output 282), of plural quantum circuit outputs resulting from the plural shots of operation the approximating unitary, that fails the conservation check (e.g., conservation check 607).

Additional Summary

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, the one or more embodiments described herein can provide a system comprising a memory 104, 204 that stores computer executable components, and a processor 106, 206 that executes the computer executable components stored in the memory 104, 204, wherein the computer executable components comprise an approximating component 120, 220 that generates an approximating unitary 156, 256 from an original unitary 152, 252, the approximating unitary 156, 256 based on a symmetry 158, 258 of the original unitary 152, 252 and omitting a selected operator 162, 262 of an exponentiated sum of operators 160, 260 comprised by the original unitary 152, 252, and a checking component 126, 226 that directs operation of a check quantum circuit 190, 290 at a quantum computer 501, the check quantum circuit 190, 290 based on a quantum circuit output 180, 280 of an operation of the approximating unitary 156, 256 at the quantum computer 501, resulting in a determination of a violation of the symmetry 194, 294.

In view of the one or more embodiments described herein, a practical application of the one or more systems, computer-implemented methods and/or computer program products described herein can be a reduction in time, energy, power, bandwidth, qubit usage and/or user entity labor employed to operate a quantum circuit. That is, as compared to operation of an original unitary and/or original quantum circuit, an approximating unitary and/or modified quantum circuit generated by the one or more embodiments described herein based on process of approximate compiling and subsequent error mitigation can employ fewer gates than would be employed to operate the original quantum circuit. As a result, use of the one or more embodiments described herein can allow for reduced and/or more efficient use of a quantum computer as compared to existing frameworks.

That is, a benefit of the system, computer-implemented method and/or computer program product can be an ability to provide a process for reducing gate count associated with quantum operation of an original unitary at a quantum system based on approximate quantum compiling. Using the approximate quantum compiling, an approximating unitary can be generated employing operators that knowingly resulting in checkable errors, where the errors are symmetry or conservation violating errors. Operators that would result in non-symmetry-violating errors can be avoided where possible, based on various approximating processes employed by the one or more embodiments. The accepted symmetry or conservation violating errors can be identified, and shots having outputs comprising the errors discarded, allowing for error mitigation of an overall result of operation of an approximating unitary based on the original unitary.

In connection therewith, the one or more embodiments described herein can provide useful and practical applications of computers, thus providing enhanced (e.g., improved and/or optimized) quantum system setup as compared to existing frameworks for quantum compiling. Overall, such computerized tools can constitute a concrete and tangible technical improvement in the field of quantum compiling. That is, the one or more embodiments described herein can provide a process to analyze and prioritize operators of the original unitary in a manner allowing for discarding one or more operators of an exponentiated sum of operators comprised by the original unitary and/or for reordering or merging two or more such operators using a plurality of different methods known to those having ordinary skill in the art. That is, various such different methods can be employed allowing for a user entity to choose a best suited, most efficient, and/or most familiar one or more different methods to reduce a gate count employed for operating of the original unitary, resulting in an approximating unitary.

One or more embodiments described herein can be employed in scale, such as to perform two or more processes at least partially in parallel with one another. For example, one or more original unitaries can be approximately compiled at least partially at a same time as one another. For another example, prioritization, selection and/or identification of operators can be performed at least partially at a same time as one another. As another example, one or more quantum circuit outputs can be evaluated at least partially at a same time as one another and/or one or more check quantum circuits can be generated at least partially at a same time as one another. Furthermore, two or more of these processes can be at least partially operated at a same time as one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to approximate compiling of a unitary to be operated at a quantum computer as a set of gates, as compared to existing systems and/or techniques unable to provide such efficiencies. Systems, computer-implemented methods and/or computer program products providing performance of these processes are of great utility in the fields of quantum computing and quantum compiling and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically or even partially automatically control quantum circuit execution at a plurality of qubits of a quantum system as the one or more embodiments described herein can provide these processes. For another example, a human, or even thousands of humans, cannot efficiently, accurately and/or effectively automatically or even partially automatically generate computer-usable data relative to initial qubit states, quantum gates and/or quantum circuits for employment by a quantum system as the one or more embodiments described herein can provide these processes. Moreover, neither can the human mind nor a human with pen and paper conduct these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

To provide additional summary, a listing of embodiments and features thereof is provided.

A system, comprising: a memory that stores computer executable components; and a processor that executes the computer executable components stored in the memory, wherein the computer executable components comprise: an approximating component that generates an approximating unitary from an original unitary, the approximating unitary based on a symmetry of the original unitary and omitting a selected operator of an exponentiated sum of operators comprised by the original unitary; and a checking component that directs operation of a check quantum circuit at a quantum computer, the check quantum circuit based on a quantum circuit output of an operation of the approximating unitary at the quantum computer, resulting in a determination of a violation of the symmetry.

The system of the preceding paragraph, wherein the computer executable components further comprise: an evaluating component that checks for a violation of conservation of a quantity to be conserved corresponding to the original unitary relative to a check quantum circuit output of the operation of the check quantum circuit.

The system of any preceding paragraph, wherein the evaluating component generates the determination of the violation of the symmetry based on a determination of the violation of conservation of the quantity to be conserved.

The system of any preceding paragraph, wherein the computer executable components further comprise: an evaluating component that performs a conservation check of plural check quantum circuit outputs resulting from execution of plural check quantum circuits respectively based on plural shots of operation the approximating unitary, including the operation of the approximating unitary.

The system of any preceding paragraph, wherein the conservation check corresponds to conservation of a quantity to be conserved that corresponds to a baseline inquiry upon which the original unitary is based.

The system of any preceding paragraph, wherein the quantity to be conserved is a particle number to be conserved.

The system of any preceding paragraph, wherein the evaluating component further identifies and discards a violating quantum circuit output, of plural quantum circuit outputs resulting from the plural shots of operation the approximating unitary, that fails the conservation check.

The system of any preceding paragraph, wherein the computer executable components further comprise: a prioritizing component that generates a prioritization of first operators, of the exponentiated sum of operators, that are determined to result in a violation of the symmetry, comprising the violation of the symmetry or another violation of the symmetry, over second operators, of the exponentiated sum of operators and including the selected operator, that are determined to result in one or more non-symmetry violating errors, wherein the generating of the approximating unitary by the approximating component is based on the prioritization.

The system of any preceding paragraph, wherein the computer executable components further comprise: an identifying component that identifies the selected operator based on determining, by the identifying component, that an operation of the selected operator at the quantum computer would result in a violation of conservation of a quantity to be conserved corresponding to the original unitary.

The system of any preceding paragraph, wherein the computer executable components further comprise: an altering component that reduces an original gate count of the original unitary by merging terms of the original unitary using a gate reduction process comprising a generalized travelling salesperson problem (GTSP), a maximum independent set problem (MISP), or a minimum feedback vertex set problem (MFVSP).

A computer-implemented method, comprising: generating, by a system operatively coupled to a processor, an approximating unitary from an original unitary, the approximating unitary based on a symmetry of the original unitary and omitting a selected operator of an exponentiated sum of operators comprised by the original unitary; and directing, by the system, operation of a check quantum circuit at a quantum computer, the check quantum circuit based on a quantum circuit output of an operation of the approximating unitary at the quantum computer, resulting in a determination of a violation of the symmetry.

The computer-implemented method of the preceding paragraph, further comprising: checking, by the system, for a violation of conservation of a quantity to be conserved corresponding to the original unitary relative to a check quantum circuit output of the operation of the check quantum circuit.

The computer-implemented method of the preceding paragraph, further comprising: generating, by the system, the determination of the violation of the symmetry based on a determination of the violation of conservation of the quantity to be conserved.

The computer-implemented method of any preceding paragraph, further comprising: identifying, by the system, the selected operator based on determining that an operation of the selected operator at the quantum computer would result in a violation of conservation of a quantity to be conserved corresponding to the original unitary.

The computer-implemented method of any preceding paragraph, further comprising: generating, by the system, a prioritization of first operators, of the exponentiated sum of operators, that are determined to result in a violation of the symmetry and including the selected operator, comprising the violation of the symmetry or another violation of the symmetry, over second operators, of the exponentiated sum of operators, that are determined to result in one or more non-symmetry violating errors, wherein the generating of the approximating unitary by the approximating component is based on the prioritization.

A computer program product facilitating a process to reduce a gate count of a quantum operation at a quantum computer, the computer program product comprising a computer readable storage medium having program instructions embodied therewith, the program instructions executable by a processor to cause the processor to: generate, by the processor, an approximating unitary from an original unitary, the approximating unitary based on a symmetry of the original unitary and omitting a selected operator of an exponentiated sum of operators comprised by the original unitary; and direct, by the processor, operation of a check quantum circuit at a quantum computer, the check quantum circuit based on a quantum circuit output of an operation of the approximating unitary at the quantum computer, resulting in a determination of a violation of the symmetry.

The computer program product of the preceding paragraph, wherein the program instructions are further executable by the processor to cause the processor to: check, by the processor, for a violation of conservation of a quantity to be conserved corresponding to the original unitary relative to a check quantum circuit output of the operation of the check quantum circuit.

The computer program product of the preceding paragraph, wherein the program instructions are further executable by the processor to cause the processor to: generate, by the processor, the determination of the violation of the symmetry based on a determination of the violation of conservation of the quantity to be conserved.

The computer program product of any preceding paragraph, wherein the program instructions are further executable by the processor to cause the processor to: identify, by the processor, the selected operator based on determining that an operation of the selected operator at the quantum computer would result in a violation of conservation of a quantity to be conserved corresponding to the original unitary.

The computer program product of any preceding paragraph, wherein the program instructions are further executable by the processor to cause the processor to: generate, by the processor, a prioritization of first operators, of the exponentiated sum of operators, that are determined to result in a violation of the symmetry and including the selected operator, comprising the violation of the symmetry or another violation of the symmetry, over second operators, of the exponentiated sum of operators, that are determined to result in one or more non-symmetry violating errors, wherein the generating of the approximating unitary by the approximating component is based on the prioritization.

Computing Environment Description

Turning next to FIG. 11, a detailed description is provided of additional context for the one or more embodiments described herein at FIGS. 1-10.

FIG. 11 and the following discussion are intended to provide a brief, general description of a suitable computing environment 1100 in which one or more embodiments described herein at FIGS. 1-10 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, such as translation of an original source code based on a configuration of a VRES evaluation code 1180. In addition to block 1180, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1180, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum system or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, one or more instructions for performing the inventive methods may be stored in block 1180 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid-state storage devices. Operating system 1122 may take several forms, such as various known proprietary operating systems or open-source Portable Operating System Interface type operating systems that employ a kernel. The code included in block 1180 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing large amounts of data, such as a storage area network (SAN) that is shared by multiple, geographically distributed computers. IoT sensor set 1125 is made up of sensors that can be used in Internet of Things applications. For example, one sensor may be a thermometer, and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101) and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine that collects and stores helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate via WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

Additional Closing Information

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:
1. A system, comprising:
a memory that stores computer executable components; and
a processor that executes the computer executable components stored in the memory, wherein the computer executable components comprise:
an approximating component that generates, for execution at a quantum computer, an approximating unitary from an original unitary, the approximating unitary based on a symmetry of the original unitary and omitting a selected operator of an exponentiated sum of operators comprised by the original unitary; and
a checking component that directs operation of a check quantum circuit at a quantum computer, the check quantum circuit based on a quantum circuit output of an operation of the approximating unitary at the quantum computer, resulting in a determination of a violation of the symmetry; and
a prioritizing component that generates a prioritization of first operators, of the exponentiated sum of operators and including the selected operator, that are determined to result in a violation of the symmetry over second operators of the exponentiated sum of operators that are determined to result in one or more non-symmetry-violating errors, wherein the generating of the approximating unitary is based on the prioritization.

2. The system of claim 1, wherein the computer executable components further comprise:

an evaluating component that checks for a violation of conservation of a quantity to be conserved corresponding to the original unitary relative to a check quantum circuit output of the operation of the check quantum circuit.

3. The system of claim 2, wherein the evaluating component generates the determination of the violation of the symmetry based on a determination of the violation of conservation of the quantity to be conserved.

4. The system of claim 1, wherein the computer executable components further comprise:

an evaluating component that performs a conservation check of plural check quantum circuit outputs resulting from execution of plural check quantum circuits respectively based on plural shots of operation the approximating unitary, including the operation of the approximating unitary.

5. The system of claim 4, wherein the conservation check corresponds to conservation of a quantity to be conserved that corresponds to a baseline inquiry upon which the original unitary is based.

6. The system of claim 5, wherein the quantity to be conserved is a particle number to be conserved.

7. The system of claim 4, wherein the evaluating component further identifies and discards a violating quantum circuit output, of plural quantum circuit outputs resulting from the plural shots of operation the approximating unitary, that fails the conservation check.

8. The system of claim 1, wherein the computer executable components further comprise:

an identifying component that identifies the selected operator based on determining, by the identifying component, that an operation of the selected operator at the quantum computer would result in a violation of conservation of a quantity to be conserved corresponding to the original unitary.

9. The system of claim 1, wherein the computer executable components further comprise:

an altering component that reduces an original gate count of the original unitary by merging terms of the original unitary using a gate reduction process comprising a generalized travelling salesperson problem (GTSP), a maximum independent set problem (MISP), or a minimum feedback vertex set problem (MFVSP).

10. A computer-implemented method, comprising:

generating, by a system operatively coupled to a processor, for execution at a quantum computer, an approximating unitary from an original unitary, the approximating unitary based on a symmetry of the original unitary and omitting a selected operator of an exponentiated sum of operators comprised by the original unitary;

generating, by the system, a prioritization of first operators, of the exponentiated sum of operators and including the selected operator, that are determined to result in a violation of the symmetry over second operators of the exponentiated sum of operators that are determined to result in one or more non-symmetry-violating errors, wherein the generating of the approximating unitary is based on the prioritization; and directing, by the system, operation of a check quantum circuit at a quantum computer, the check quantum circuit based on a quantum circuit output of an operation of the approximating unitary at the quantum computer, resulting in a determination of a violation of the symmetry.

11. The computer-implemented method of claim 10, further comprising:

checking, by the system, for a violation of conservation of a quantity to be conserved corresponding to the original unitary relative to a check quantum circuit output of the operation of the check quantum circuit.

12. The computer-implemented method of claim 11, further comprising:

generating, by the system, the determination of the violation of the symmetry based on a determination of the violation of conservation of the quantity to be conserved.

13. The computer-implemented method of claim 10, further comprising:

identifying, by the system, the selected operator based on determining that an operation of the selected operator at the quantum computer would result in a violation of conservation of a quantity to be conserved corresponding to the original unitary.

14. A computer program product facilitating a process to reduce a gate count of a quantum operation at a quantum computer, the computer program product comprising a non-transitory computer readable storage medium having program instructions embodied therewith, the program instructions executable by a processor to cause the processor to:

generate, by the processor, for execution at a quantum computer, an approximating unitary from an original unitary, the approximating unitary based on a symmetry of the original unitary and omitting a selected operator of an exponentiated sum of operators comprised by the original unitary;

generate, by the processor, a prioritization of first operators, of the exponentiated sum of operators and including the selected operator, that are determined to result in a violation of the symmetry over second operators of the exponentiated sum of operators that are determined to result in one or more non-symmetry-violating errors, wherein the generating of the approximating unitary is based on the prioritization; and direct, by the processor, operation of a check quantum circuit at a quantum computer, the check quantum circuit based on a quantum circuit output of an operation of the approximating unitary at the quantum computer, resulting in a determination of a violation of the symmetry.

15. The computer program product of claim 14, wherein the program instructions are further executable by the processor to cause the processor to:

check, by the processor, for a violation of conservation of a quantity to be conserved corresponding to the original unitary relative to a check quantum circuit output of the operation of the check quantum circuit.

16. The computer program product of claim 15, wherein the program instructions are further executable by the processor to cause the processor to:

generate, by the processor, the determination of the violation of the symmetry based on a determination of the violation of conservation of the quantity to be conserved.

17. The computer program product of claim 14, wherein the program instructions are further executable by the processor to cause the processor to:

identify, by the processor, the selected operator based on determining that an operation of the selected operator at the quantum computer would result in a violation of conservation of a quantity to be conserved corresponding to the original unitary.

\* \* \* \* \*